(12) United States Patent
Selvanesan et al.

(10) Patent No.: US 12,041,581 B2
(45) Date of Patent: Jul. 16, 2024

(54) RADIO SIDELINK FRAME STRUCTURE

(71) Applicant: Fraunhofer-Gesellschaft zur Förderung der angewandten Forschung e.V., Munich (DE)

(72) Inventors: Sarun Selvanesan, Berlin (DE); Thomas Fehrenbach, Berlin (DE); Cornelius Hellge, Berlin (DE); Thomas Wirth, Berlin (DE); Thomas Schierl, Berlin (DE); Robin Rajan Thomas, Berlin (DE); Baris Göktepe, Berlin (DE)

(73) Assignee: Fraunhofer-Gesellschaft zur Förderung der angewandten Forschung e.V. (DE)

( * ) Notice: Subject to any disclaimer, the term of this patent is extended or adjusted under 35 U.S.C. 154(b) by 344 days.

(21) Appl. No.: 17/210,331

(22) Filed: Mar. 23, 2021

(65) Prior Publication Data

US 2021/0212025 A1 Jul. 8, 2021

Related U.S. Application Data

(63) Continuation of application No. PCT/EP2019/075815, filed on Sep. 25, 2019.

(30) Foreign Application Priority Data

Sep. 27, 2018 (EP) ..................... 18197384

(51) Int. Cl.
*H04W 72/02* (2009.01)
*H04W 4/06* (2009.01)
(Continued)

(52) U.S. Cl.
CPC ............. *H04W 72/02* (2013.01); *H04W 4/06* (2013.01); *H04W 72/0446* (2013.01);
(Continued)

(58) Field of Classification Search
CPC ...... H04W 72/02; H04W 72/005; H04W 4/06
See application file for complete search history.

(56) References Cited

U.S. PATENT DOCUMENTS

| 10,419,259 B1* | 9/2019 | Baldemair | ............ H04L 5/0094 |
| 2004/0184426 A1* | 9/2004 | Tan | ........................ H04W 72/56 |
| | | | 370/349 |

(Continued)

FOREIGN PATENT DOCUMENTS

| CN | 104322129 A | 1/2015 |
| CN | 107852717 A | 3/2018 |

(Continued)

OTHER PUBLICATIONS

Office Action dated Jun. 20, 2022 issued in the parallel Japanese patent application No. 2021-517450.

(Continued)

*Primary Examiner* — Zhiren Qin
(74) *Attorney, Agent, or Firm* — Haynes and Boone, LLP

(57) ABSTRACT

A wireless communication system includes one or more base stations, and a plurality of user devices, UEs. The plurality of UEs includes a plurality of first UEs operating in a first mode and a plurality of second UEs operating in a second mode. The first UEs and the second UEs are configured for a sidelink communication. A sidelink transmission includes a sidelink frame having a control region and a data region. The control region includes a first control region and a second control region, the first control region for transmitting control data of a first UE, the second control region for transmitting control data of a second UE, and the first and second control regions including a plurality of a common resources.

13 Claims, 22 Drawing Sheets

(51) Int. Cl.
*H04W 72/0446* (2023.01)
*H04W 72/0453* (2023.01)
*H04W 72/30* (2023.01)
*H04W 92/18* (2009.01)

(52) U.S. Cl.
CPC ....... *H04W 72/0453* (2013.01); *H04W 72/30* (2023.01); *H04W 92/18* (2013.01)

(56) References Cited

U.S. PATENT DOCUMENTS

| | | | |
|---|---|---|---|
| 2013/0279446 A1* | 10/2013 | Lv | H04L 5/001 370/329 |
| 2015/0009952 A1 | 1/2015 | Berggren et al. | |
| 2016/0295624 A1 | 10/2016 | Novlan et al. | |
| 2017/0006586 A1* | 1/2017 | Gulati | H04W 72/23 |
| 2017/0142692 A1 | 5/2017 | Kim et al. | |
| 2017/0332207 A1 | 11/2017 | Sheng et al. | |
| 2018/0098323 A1 | 4/2018 | Zhang et al. | |
| 2018/0255499 A1 | 9/2018 | Loehr et al. | |
| 2021/0306824 A1* | 9/2021 | Li | H04W 4/40 |

FOREIGN PATENT DOCUMENTS

| | | |
|---|---|---|
| JP | 2018-533235 A | 11/2018 |
| WO | WO 2015122629 A1 | 8/2015 |
| WO | WO 2017/051494 | 3/2017 |
| WO | WO 2020033089 A1 | 2/2020 |

OTHER PUBLICATIONS

Office Action dated Jun. 15, 2022 issued in the parallel Korean patent application No. 10-2021-7011025.
Xiaomi, On resource allocation for NR V2x sidelink communications, R1-1809178, 3GPP TSG RAN WG1 #94, Aug. 10, 2018, http://www.3gpp.org/ftp/tsg_ran/WG1_RL1/TSGR1_94/Docs/R1-1809178.zip.
Panasonic, Discussion on supporting unicast, groupcast and broadcast via NR sidelink, R1-1808646, 3GPP TSG RAN WG1 #94, Aug. 10, 2018, http://www.3gpp.org/ftp/tsg_ran/WG1_RL1/TSGR1_94/Docs/R1-1808646.zip.
Fraunhofer HHI, Fraunhofer IIS, Enhancements for NR V2X Resource Allocation Mechanism, R1-1808309, 3GPP TSG RAN WG1 #94, Aug. 10, 2018.
"3$^{rd}$ Generation Partnership Program; Technical Specification Group Services and System Aspects; Study on Architecture Enhancements to Support Proximity-based Services (ProSe) (Release 12)", 3GPP TR23.703 (Mar. 10, 2014).
"3$^{rd}$ Generation Partnership Project; Technical Specification Group Radio Access Network; Study on LTE-based V2X Services; (Release 14)", 3GPP TR36.885 v14.0.0 (Jul. 20, 2016).
"On Support of Sidelink Unicast, Groupcast and Broadcast," Xiaomi Communications, 3GPP TSG RAN WGI Meeting #94, Gothenburg, Sweden, 3GPP R1-1809174 (Aug. 24, 2018).
Samsung, Discussion on physical layer structures and procedures for NR V2X [online], 3GPP TSG RAN WG1 #94 R1-1808776, Internet <URL: http://www.3gpp.org/ftp/tsg_ran/WG1_RL1/TSGR1_94/Docs/R1-1808776.zip>, Aug. 10, 2018 (10 pages).
Office Action dated Apr. 17, 2023 issued in the parallel JP patent application No. 2021-517450 (8 pages).
Office Action dated Feb. 23, 2022 issued in the parallel Indian patent application No. 202117018686 (7 pages).
ERICSSON: "Frame Structure for D2D-Enabled LTE Carriers"; 3GPP Draft; RI-142408 Frame Structure D2D, 3rd Generation Partnership Project (3GPP), Mobile Competence Centre . • 650, Route Des L. Ucio Les .• F-06921 Sophia-Anti Poli S Cedex • FRANCE vol. RAN WGI, No. Seoul, Korea; May 19, 2014-May 23, 2014 May 18, 2014 (May 18, 2014), XP050789526, Retrieved from the Internet: URL:http://www.3gpp.org/ftp/Meetings_3GPP_SYNC/RANI/RANI/Docs/ [retrieved on May 18, 2014].
Nokia et al: "Native sidelink support in flexible frame structure for NR", 3GPP Draft; RI-167268, 3rd Generation Partnership Project (3GPP), Mobile Competence Centre; 650, Route Des Lucioles ; F-06921 Sophia-Antipolis Cedex; France vol. RAN WGI, No. Gothenburg, Sweden; Aug. 22, 2016-Aug. 26, 2016 Aug. 12, 2016 (Aug. 12, 2016), XP051142023, Retrieved from the Internet: URL:http://www.3gpp.org/ftp/tsg ran/WG1_RL1/TSGR1_86/Docs/ [retrieved on Aug. 12, 2016].
Notice of Allowance dated Feb. 6, 2024 in related Korean Patent Application No. 10-2021-7011025 (3 pages).
Office Action dated Jan. 11, 2024 in parallel Chinese Patent Application No. 201980063710.X (18 pages).

* cited by examiner

RADIO SIDELINK FRAME STRUCTURE

CROSS-REFERENCES TO RELATED APPLICATIONS

This application is a continuation of co-pending International Application No. PCT/EP2019/075815, filed Sep. 25, 2019, which is incorporated herein by reference in its entirety, and additionally claims priority from European Application No. 18 197 384.3, filed Sep. 27, 2018, which is incorporated herein by reference in its entirety.

The present application relates to the field of wireless communication networks or systems, more specifically to a sidelink communication of user devices in such communication systems. Embodiments relate to a new radio sidelink frame structure, NR SL FS.

BACKGROUND OF THE INVENTION

FIG. 1 is a schematic representation of an example of a terrestrial wireless network 100 including, as is shown in FIG. 1A a core network 102 and one or more radio access networks $RAN_1$, $RAN_2$, ... $RAN_N$. FIG. 1B is a schematic representation of an example of a radio access network $RAN_n$ that may include one or more base stations $gNB_1$ to $gNB_5$, each serving a specific area surrounding the base station schematically represented by respective cells $106_1$ to $106_5$. The base stations are provided to serve users within a cell. The term base station, BS, refers to a gNB in 5G networks, an eNB in UMTS/LTE/LTE-A/LTE-A Pro, or just a BS in other mobile communication standards. A user may be a stationary device or a mobile device. The wireless communication system may also be accessed by mobile or stationary IoT devices which connect to a base station or to a user. The mobile devices or the IoT devices may include physical devices, ground based vehicles, such as robots or cars, aerial vehicles, such as manned or unmanned aerial vehicles (UAVs), the latter also referred to as drones, buildings and other items or devices having embedded therein electronics, software, sensors, actuators, or the like as well as network connectivity that enable these devices to collect and exchange data across an existing network infrastructure. FIG. 1B shows an exemplary view of only five cells, however, the $RAN_n$ may include more or less such cells, and $RAN_n$ may also include only one base station. FIG. 1B shows two users $UE_1$ and $UE_2$, also referred to as user equipment, UE, that are in cell $106_2$ and that are served by base station $gNB_2$. Another user $UE_3$ is shown in cell $106_4$ which is served by base station $gNB_4$. The arrows $108_1$, $108_2$ and $108_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. Further, FIG. 1B shows two IoT devices $110_1$ and $110_2$ in cell $106_4$, which may be stationary or mobile devices. The IoT device $110_1$ accesses the wireless communication system via the base station $gNB_4$ to receive and transmit data as schematically represented by arrow $112_1$. The IoT device $110_2$ accesses the wireless communication system via the user $UE_3$ as is schematically represented by arrow $112_2$. The respective base station $gNB_1$ to $gNB_5$ may be connected to the core network 102, e.g. via the S1 interface, via respective backhaul links $114_1$ to $114_5$, which are schematically represented in FIG. 1B by the arrows pointing to "core". The core network 102 may be connected to one or more external networks. Further, some or all of the respective base station $gNB_1$ to $gNB_5$ may connected, e.g. via the S1 or X2 interface or XN interface in NR, with each other via respective backhaul links $116_1$ to $116_5$, which are schematically represented in FIG. 1B by the arrows pointing to "gNBs".

For data transmission a physical resource grid may be used. The physical resource grid may comprise a set of resource elements to which various physical channels and physical signals are mapped. For example, the physical channels may include the physical downlink and uplink shared channels (PDSCH, PUSCH) carrying user specific data, also referred to as downlink and uplink payload data, the physical broadcast channel (PBCH) carrying for example a master information block (MIB) and a system information block (SIB), the physical downlink and uplink control channels (PDCCH, PUCCH) carrying for example the downlink control information (DCI). For the uplink, the physical channels may further include the physical random access channel (PRACH or RACH) used by UEs for accessing the network once a UE synchronized and obtained the MIB and SIB. The physical signals may comprise reference signals or symbols (RS), synchronization signals and the like. The resource grid may comprise a frame or radio frame having a certain duration in the time domain and having a given bandwidth in the frequency domain. The frame may have a certain number of subframes of a predefined length. Each subframe may include two slots of 6 or 7 OFDM symbols depending on the cyclic prefix (CP) length. A frame may also consist of a smaller number of OFDM symbols, e.g. when utilizing shortened transmission time intervals (sTTI) or a mini-slot/non-slot-based frame structure comprising just a few OFDM symbols.

The wireless communication system may be any single-tone or multicarrier system using frequency-division multiplexing, like the orthogonal frequency-division multiplexing (OFDM) system, the orthogonal frequency-division multiple access (OFDMA) system, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used. The wireless communication system may operate, e.g., in accordance with the LTE-Advanced pro standard or the 5G or NR, New Radio, standard.

The wireless network or communication system depicted in FIG. 1 may by a heterogeneous network having distinct overlaid networks, e.g., a network of macro cells with each macro cell including a macro base station, like base station $gNB_1$ to $gNB_5$, and a network of small cell base stations (not shown in FIG. 1), like femto or pico base stations.

In addition to the above described terrestrial wireless network also non-terrestrial wireless communication networks exist including spaceborne transceivers, like satellites, and/or airborne transceivers, like unmanned aircraft systems. The non-terrestrial wireless communication network or system may operate in a similar way as the terrestrial system described above with reference to FIG. 1, for example in accordance with the LTE-Advanced Pro standard or the 5G or NR, new radio, standard.

In mobile communication networks, for example in a network like that described above with reference to FIG. 1, like an LTE or 5G/NR network, there may be UEs that communicate directly with each other over one or more sidelink (SL) channels, e.g., using the PC5 interface. UEs that communicate directly with each other over the sidelink may include vehicles communicating directly with other vehicles (V2V communication), vehicles communicating with other entities of the wireless communication network (V2X communication), for example roadside entities, like traffic lights, traffic signs, or pedestrians. Other UEs may not be vehicular related UEs and may comprise any of the above-mentioned devices. Such devices may also communicate directly with each other (D2D communication) using the SL channels.

When considering two UEs directly communicating with each other over the sidelink, both UEs may be served by the same base station, i.e., both UEs may be within the coverage area of a base station, like one of the base stations depicted in FIG. 1. This is referred to as a "in coverage" scenario. In accordance with other examples, both UEs that communicate over the sidelink may not be served by a base station which is referred to as an "out-of-coverage" scenario. It is noted that "out-of-coverage" does not mean that the two UEs are not within one of the cells depicted in FIG. 1, rather, it means that these UEs are not connected to a base station, for example, they are not in an RRC connected state. Yet another scenario is called a "partial coverage" scenario, in accordance with which one of the two UEs which communicate with each other over the sidelink, is served by a base station, while the other UE is not served by the base station.

When considering two UEs directly communicating with each other over the sidelink, e.g. PC5, one of the UEs may also be connected with a BS, and may relay information from the BS to the other UE via the sidelink interface. The relaying may be performed in the same frequency band (in-band-relay) or using another frequency band (out-of-band relay). In the first case, communication on the Uu and on the sidelink may be decoupled using different time slots as in time division duplex (TDD) systems.

FIG. 2 is a schematic representation of a situation in which two UEs directly communicating with each other are both in coverage of a base station. The base station gNB has a coverage area that is schematically represented by the circle 200 which, basically, corresponds to the cell schematically represented in FIG. 1. The UEs directly communicating with each other include a first vehicle 202 and a second vehicle 204 both in the coverage area 200 of the base station gNB. Both vehicles 202, 204 are connected to the base station gNB and, in addition, they are connected directly with each other over the PC5 interface. The scheduling and/or interference management of the V2V traffic is assisted by the gNB via control signaling over the Uu interface, which is the radio interface between the base station and the UEs. The gNB assigns the resources to be used for the V2V communication over the sidelink. This configuration is also referred to as a mode 1 configuration in NR V2X or as a mode 3 configuration in LTE V2X.

FIG. 3 is a schematic representation of a situation in which the UEs are not in coverage of a base station, i.e., the respective UEs directly communicating with each other are not connected to a base station, although they may be physically within a cell of a wireless communication network. Three vehicles 206, 208 and 210 are shown directly communicating with each other over a sidelink, e.g., using the PC5 interface. The scheduling and/or interference management of the V2V traffic is based on algorithms implemented between the vehicles. This configuration is also referred to as a mode 2 configuration in NR V2X or as a mode 4 configuration in LTE V2X. As mentioned above, the scenario in FIG. 3 which is an out-of-coverage scenario does not mean that the respective mode 4 UEs are outside of the coverage 200 of a base station, rather, it means that the respective mode 4 UEs are not served by a base station or are not connected to the base station of the coverage area. Thus, there may be situations in which, within the coverage area 200 shown in FIG. 2, in addition to the mode 3 UEs 202, 204 also mode 4 UEs 206, 208, 210 are present.

In the above-described scenarios of vehicular user devices, UEs, a plurality of such user devices may form a user device group, also referred to simply as group, and the communication within the group or among the group members may be performed via the sidelink interfaces between the user devices, like the PC5 interface. Within the wireless communication network or within a cell thereof, a plurality of such groups may exist at the same time. While it is noted that the communication within the group is via sidelink communication, in case the group or at least some group members thereof are in-coverage, this does not exclude that also some or all of the group members communicate with other entities outside the group via the base station or via the sidelink. For example, the above-described scenarios using vehicular user devices may be employed in the field of the transport industry in which a plurality of vehicles being equipped with vehicular user devices may be grouped together, for example, by a remote driving application.

Other use cases in which a plurality of user devices may be grouped together for a sidelink communication among each other include, for example, factory automation and electrical power distribution. In the case of factory automation, a plurality of mobile or stationary machines within a factory may be equipped with user devices and grouped together for a sidelink communication, for example for controlling the operation of the machine, like a motion control of a robot. In the case of electrical power distribution, entities within the power distribution grid may be equipped with respective user devices which, within a certain area of the system may be grouped together so as to communicate via a sidelink communication with each other so as to allow for monitoring the system and for dealing with power distribution grid failures and outages.

It is noted that the information in the above section is only for enhancing the understanding of the background of the invention and therefore it may contain information that does not form conventional technology that is already known to a person of ordinary skill in the art.

Starting from a conventional technology described above, for a wireless communication system in which a plurality of users may perform sidelink communications there may be a need for an improved frame structure for such sidelink communication.

SUMMARY

According to an embodiment, a wireless communication system may have: a plurality of user devices, UEs, wherein at least some of the UEs are configured for a sidelink communication, wherein the wireless communication system is configured to provide a set of resources for the sidelink communication among the UEs, the set of resources including: a first subset of resources to be allocated for groupcast transmissions over the sidelink for one or more groups of UEs, a group including two or more UEs, and a second subset of resources to be allocated for a broadcast transmission over the sidelink from one or more UEs to all UEs.

Another embodiment may have a user device, UE, for a wireless communication system having one or more base stations, and a plurality of user devices, UEs, wherein the UE is configured for a sidelink communication, wherein the UE is configured to use a set of resources for the sidelink communication among the UEs, the set of resources including: a first subset of resources to be allocated for groupcast transmissions over the sidelink for one or more groups of UEs, a group including two or more UEs, and a second subset of resources to be allocated for a broadcast transmission over the sidelink from one or more UEs to all UEs.

Another embodiment may have a base station for a wireless communication system having one or more base stations, and a plurality of user devices, UEs, wherein at least some of the UEs are configured for a sidelink communication, wherein the base station is configured to provide a set of resources for the sidelink communication among the UEs, the set of resources including: a first subset of resources to be allocated for groupcast transmissions over the sidelink for one or more groups of UEs, a group including two or more UEs, and a second subset of resources to be allocated for a broadcast transmission over the sidelink from one or more UEs to all UEs.

Another embodiment may have a method for a sidelink communication in a wireless communication system having one or more base stations, and a plurality of user devices, UEs, wherein at least some of the UEs are configured for a sidelink communication, the method having the step of: providing a set of resources for the sidelink communication among the UEs, the set of resources including: a first subset of resources to be allocated for groupcast transmissions over the sidelink for one or more groups of UEs, a group including two or more UEs, and a second subset of resources to be allocated for a broadcast transmission over the sidelink from one or more UEs to all UEs.

Another embodiment may have a non-transitory digital storage medium having a computer program stored thereon to perform the method for a sidelink communication in a wireless communication system having one or more base stations, and a plurality of user devices, UEs, wherein at least some of the UEs are configured for a sidelink communication, the method having the step of: providing a set of resources for the sidelink communication among the UEs, the set of resources including: a first subset of resources to be allocated for groupcast transmissions over the sidelink for one or more groups of UEs, a group including two or more UEs, and a second subset of resources to be allocated for a broadcast transmission over the sidelink from one or more UEs to all UEs, when said computer program is run by a computer.

BRIEF DESCRIPTION OF THE DRAWINGS

Embodiments of the present invention will be detailed subsequently referring to the appended drawings, in which:

FIGS. 17A-1 and 17A-2, 17B and 17C illustrates an embodiment of a frequency domain multiplexed common control channel and non-deferred time domain multiplexed data regions within the inventive resource pools;

FIGS. 18-1 and 18-2 illustrates a further embodiment which is similar to the one in FIG. 17 except that the control and data are time-deferred to one another.

DETAILED DESCRIPTION OF THE INVENTION

Embodiments of the present invention is now described in more detail with reference to the accompanying drawings in which the same or similar elements have the same reference signs assigned.

The initial vehicle-to-everything (V2X) specification was included in LTE Release 14 of the 3GPP standard. The scheduling and assignment of resources had been modified according to the V2X requirements, while the original device-to-device (D2D) communication standard has been used as a basis of the design. Cellular V2X has been agreed to operate in two configurations from a resource allocation perspective, namely in the above-described mode 3 and mode 4 configurations. As mentioned above, in the V2X mode 3 configuration the scheduling and interference management of resources is performed by the base station for UEs within the coverage of the base station so as to enable sidelink, SL, communications, like vehicle-to-vehicle communications. The control signaling is provided to the UE over the Uu interface, for example using the downlink control indicator, DCI, and is dynamically assigned by the base station. In the V2X mode 4 configuration the scheduling and interference management for SL communications is autonomously performed using distributed or decentralized algorithms among the UEs based on a preconfigured resource configuration.

In- and Out-of-Coverage Collision Avoidance

In conventional approaches, the control and data channels, like the PSCCH and PSSCH, are multiplexed in the frequency domain, FDM, based on a current LTE V2X SL design which is now shortly described.

Figure 4:
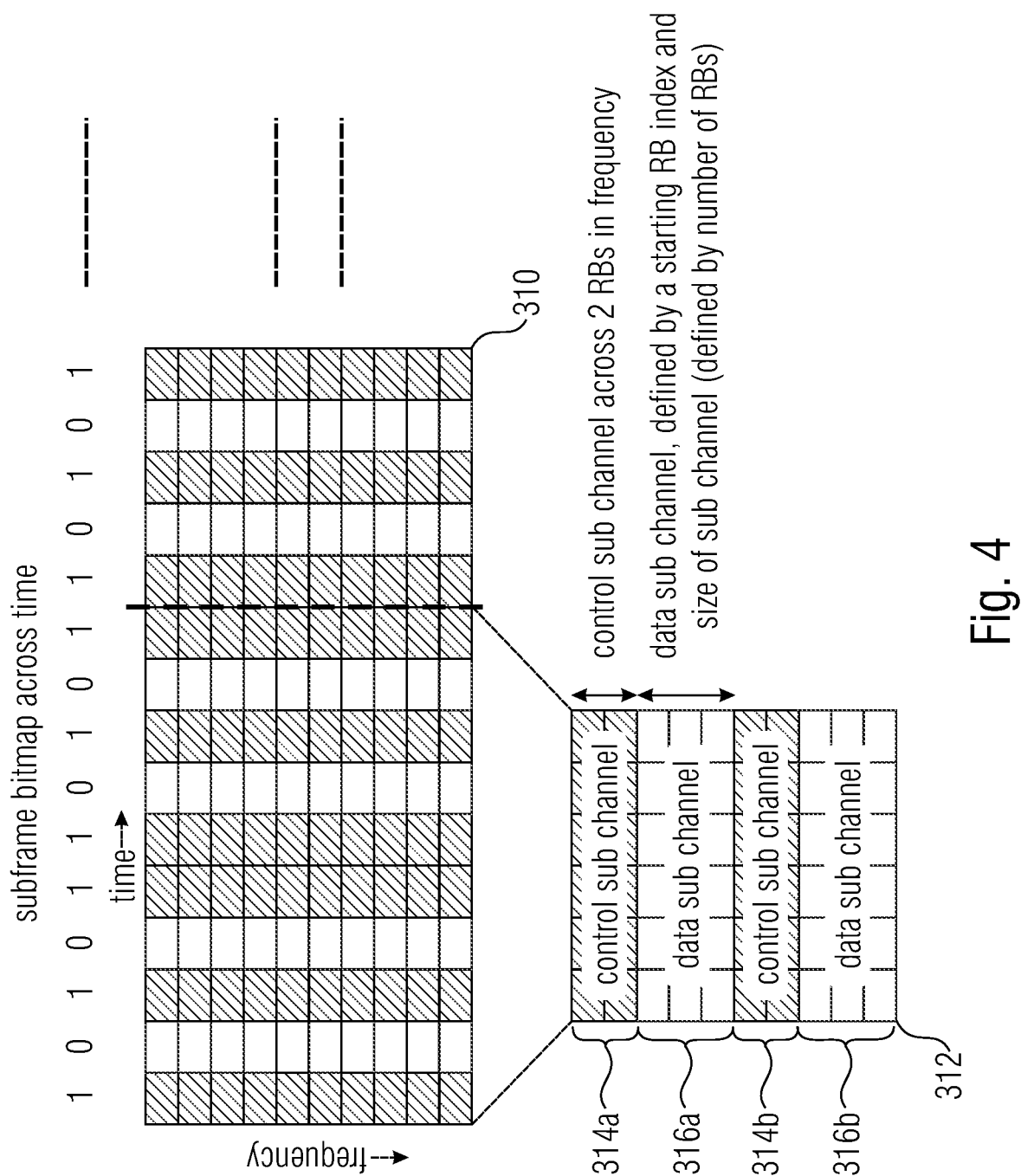
FIG. 4 illustrates an example of a resource pool which is defined across time and frequency.

FIG. 4 illustrates an example of a resource pool which is defined across time and frequency. The top of FIG. 4 illustrates the resources in time and frequency that may be available at the base station for a communication with one or more UEs being connected to the base station. From these available resources a subset of resources is selected for defining the resource pool. As is illustrated in FIG. 4, across the time domain, the base station provides the UE with a subframe bitmap of variable lengths. The bitmap indicates whether resources at a certain time are to be used for the resource pool (indicated by a "1" in the bitmap) and which resources are not to be used for the resource pool (indicated by a "0" in the bitmap). As is indicated by the vertical dotted line in the upper part of FIG. 4, the bitmap may be repeated across the duration of the resource pool. The resource pool includes data and control sub-channels, which are defined on the basis of the subframes indicated by the bitmap and across the frequency. The data sub-channel is defined using a set of parameters that include the number of sub-channels together with a resource block, RB, index, and the size of the sub-channel in RBs. The control sub-channels are defined also on the basis of the subframes indicated in the bitmap, however, only the starting RB index is specified as the control channel extends only across two RBs in frequency. In the example of FIG. 4, one may see that from the block 310 of available resources the resource pool 312 is selected including two control sub-channels 314a and 314b as well as two data sub-channels 316a and 316b. In the example of FIG. 4, the control sub-channels are indicated by specifying the respective starting resource block in each selected subframes, namely the first and sixth RBs, the data sub-channels are described by their respective starting RBs, namely the third and eighth RBs in each subframe with a size of three RBs in frequency. Thus, in accordance with conventional approaches, a resource pool may contain a minimum of two sub-channels, one sub-channel for control information, like the PSCCH, and one sub-channel for data, like the PSSCH. At a given transmit time interval, TTI, or subframe, a transmitting UE broadcasts a sidelink control information, SCI, in the control channel, followed by the data in the same subframe. The SCI will point to the resources within the subframe that data will be transmitted on, and a receiving UE will listen to the control sub-channel so that when it does receive an SCI it is made aware where the data is to be received.

In the above-described conventional approaches, the base station may decide whether it assists in the scheduling of resources or whether the UEs need to select the resources to be used for transmission. This defines the above-mentioned two operational modes of a V2X system, namely the mode 3 and mode 4. However, mode 3 and mode 4 UEs, also referred to as in-coverage UEs and out-of-coverage UEs may use the same set of resources or resource pool provided by the base station or by the system for the sidelink communication. For example, a resource pool or a set of resources to be used for the sidelink may be fully shared among in-coverage UEs and out-of-coverage UEs. In accordance with other examples, the in-coverage UEs may use a first set of resources or resource pool, and the out-of-coverage UEs may use a second resource pool, however, the in-coverage resource pool and the out-of-coverage resource pool may partially overlap.

This sharing of resources may result in collisions between in-coverage UEs and out-of-coverage UEs when transmitting using the shared resources, and one aspect of the present invention aims at reducing or avoiding such undesired collisions by employing the various options offered by 5G or NR to design the sidelink, SL, for example due to the flexible capability of switching between different numerologies. More specifically, embodiments of the first aspect of the present invention provide a novel SL collision avoidance scheme for NR V2X that enables an enhanced coexistence between scheduled and autonomous resource selection. Scheduled resource selection pertains to mode 1 UEs in NR V2X or mode 3 UEs in LTE V2X, in the following also referred to as M1 UEs or in-coverage UEs, whereas autonomous resource selection pertains mode 2 UEs in NR V2X or mode 4 UEs in LTE V2X, the following also referred to as M2 UEs or out-of-coverage UEs. Embodiments of the first aspect of the present invention are applicable to cases in which the control and data channels, like the PSSCH and the PSSCH are multiplexed in the time domain, TDM, or in the frequency domain, FDM. The embodiments in accordance with the first aspect of the present invention as described below are advantageous as the likelihood of resource collisions between M1 and M2 UEs during a SL transmission is decreased, a resource efficiency may be increased by transmitting data in the control channel, and vacant control resources may be used for M2 SL transmissions or for high priority M1 transmissions directly in an adjacent control region.

Dedicated Resources for Broadcast and Groupcast

In accordance with a second aspect, embodiments of the present invention provide dedicated resources for broadcast and groupcast within an entire set of resources allocated for sidelink communications in a wireless communication system. Conventionally, like in LTE, a base station provides the UEs with information regarding a set of resources or resource pool when being in-coverage, as well as configuration information about the available resources if the UEs have to automatically allocate resources for its transmission when being, for example, out-of-coverage. When the UEs autonomously select resources, the probability of two UEs selecting the same resource is high, causing allocation collisions. Moreover, conventionally, e.g. in previous LTE releases, only broadcast type communication is supported in the sidelink, so that it was sufficient to only indicate a resource pool for the sidelink communication in which only a single communication type occurred In accordance with embodiments of the second aspect of the present invention, rather than limiting the sidelink communication to a broadcast, also groupcast communications are allowed. In accordance with embodiments of the second aspect of the present invention, the probability of collisions is reduced by dividing the entire set of resources, like the resource pool or a bandwidth part (BWP), which is allocated to be used by UEs for a sidelink communication, like a V2X communication, dependent on the communication type, namely whether a broadcast communication or a groupcast communication is desired. This approach is advantageous as it uses for respective communications dedicated sets of resources or resource pools so that collisions among UEs sharing the resources are reduced, wherein the UEs may include in-coverage UEs and/or out-of-coverage UEs. The probability of collisions is reduced, as UEs using different kinds of communication types use different sets of resources which already reduces the probability of collisions substantially.

A group of UEs may include at least two members, and a groupcast communication for a group including only two members may be referred to as a unicast communication. In other words, a unicast communication from one UE directly to only one other UE over the sidelink may be considered to be a special subcase of a groupcast communication and the resources from the groupcast pool may be used. Alternatively, for such communications another subset of dedicated resources may be used. So that the set of resources may further include a third subset of resources to be allocated for one or more unicast transmissions over the sidelink from a first UE to a second UE.

In accordance with further embodiments of the second aspect of the present invention, when using dedicated resource pools for broadcast and groupcast for sidelink communications, the control and data resources may be designed in a time duplexed or frequency duplexed manner, and a set of resources or resource pool may include multiple groups of resources having different numerologies, like different bandwidth parts, or a single group of resources having a certain numerology, like a certain bandwidth part, may include multiple resource pools. In other words, one or more of the broadcast and groupcast resource pools may include resources of the same numerology or within each resource pool two or more groups of resources having different numerologies may be employed. In accordance with other embodiments, a certain group of resources with a predefined numerology, like a certain bandwidth part, may be used as a basis for the resources which are defining the broadcast and groupcast resource pool.

In accordance with further embodiments, the control information provided for the sidelink communication may be repeated at certain intervals across time or frequency followed by the data resources so that the control data and the user data are not separated, rather, there is a clear control-data association which avoids the need for providing a master allocation entity. Other embodiments allow to cater longer data packets, and the SCI may relate to more than one data portion or packet or to a longer data portion.

In accordance with yet further embodiments, in addition to the above-mentioned resource pools for the broadcast and groupcast an additional control channel may be provided, referred to as a common control channel that spans the entire duration of the resource pools, for example, it may result in a dedicated control bandwidth part, and the dedicated control channels include control regions which result in bandwidth parts allocated for specific communication types, like broadcast and groupcast. The control information in the data may be deferred in time with respect to each other, or may occur at the same time.

Figure 1A:
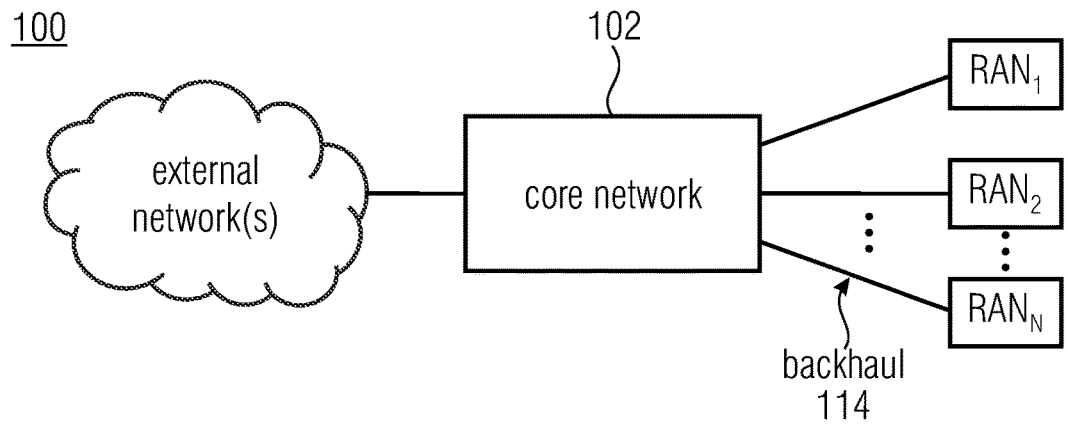
FIGS. 1A and 1B shows a schematic representation of an example of a wireless communication system.
Figure 1B:
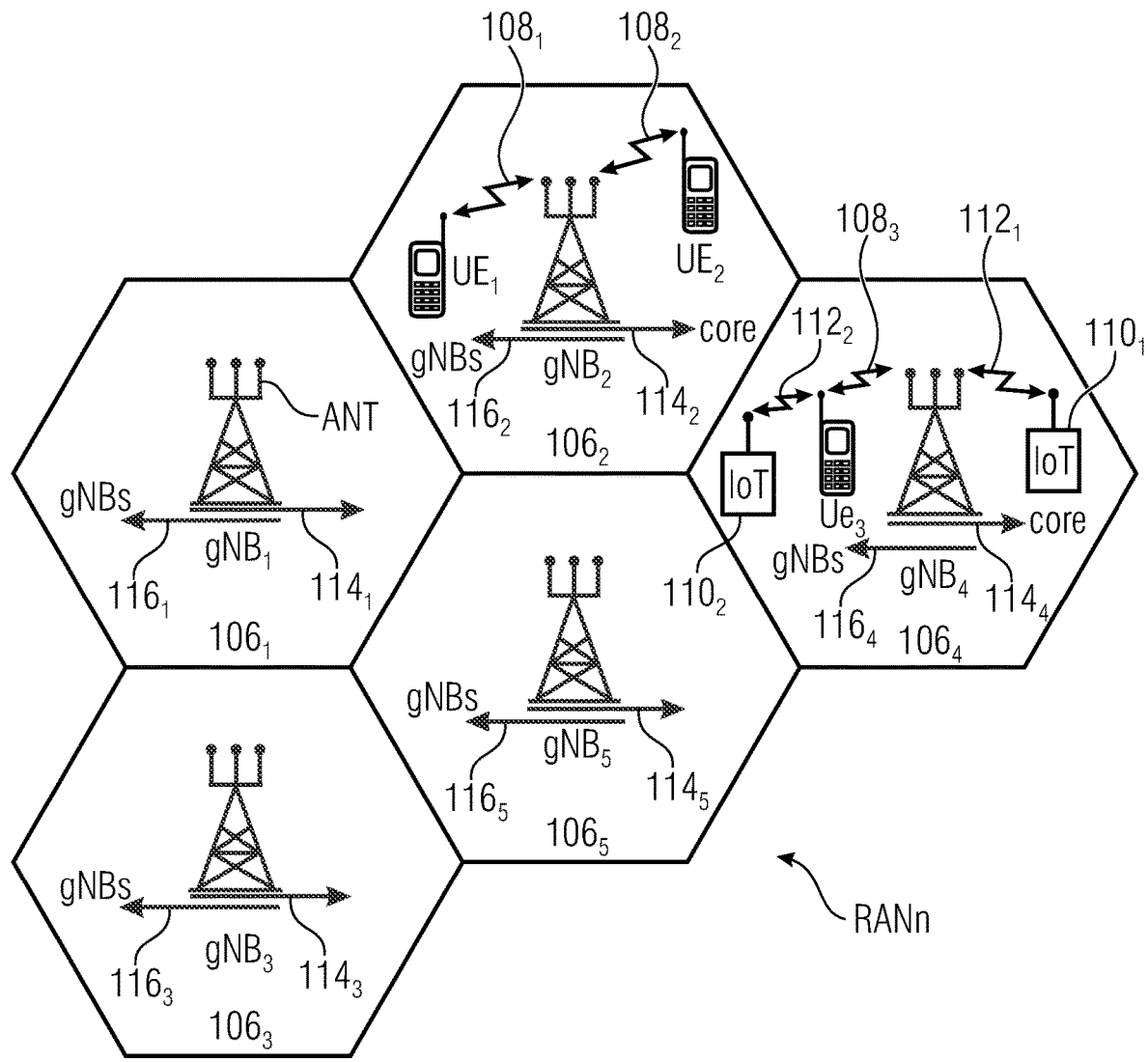
Figure 2:
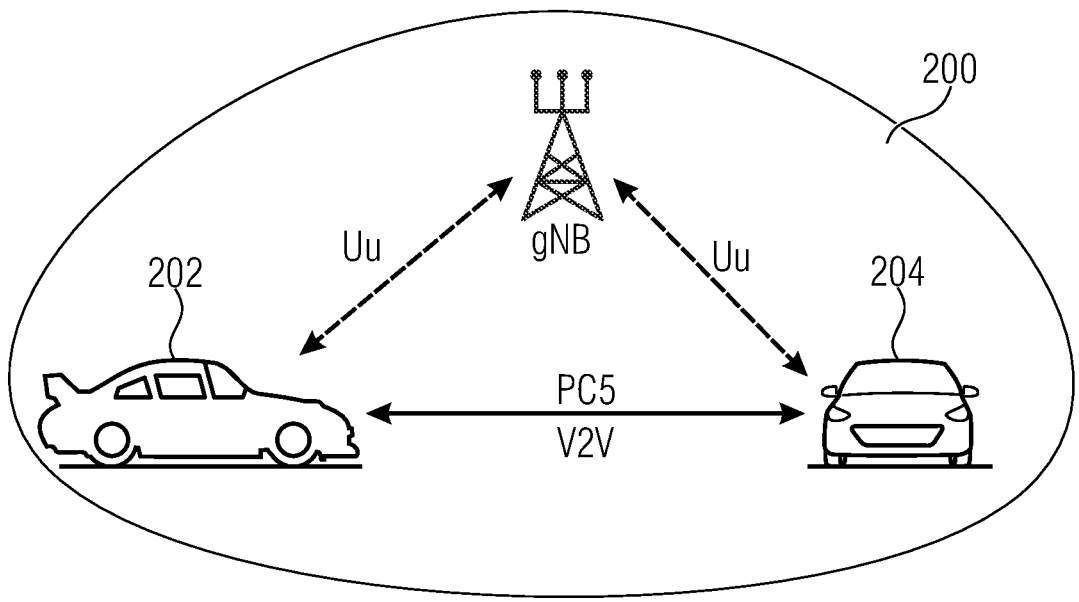
FIG. 2 shows a schematic representation of a situation in which UEs directly communicating with each other are in coverage of a base station.
Figure 3:
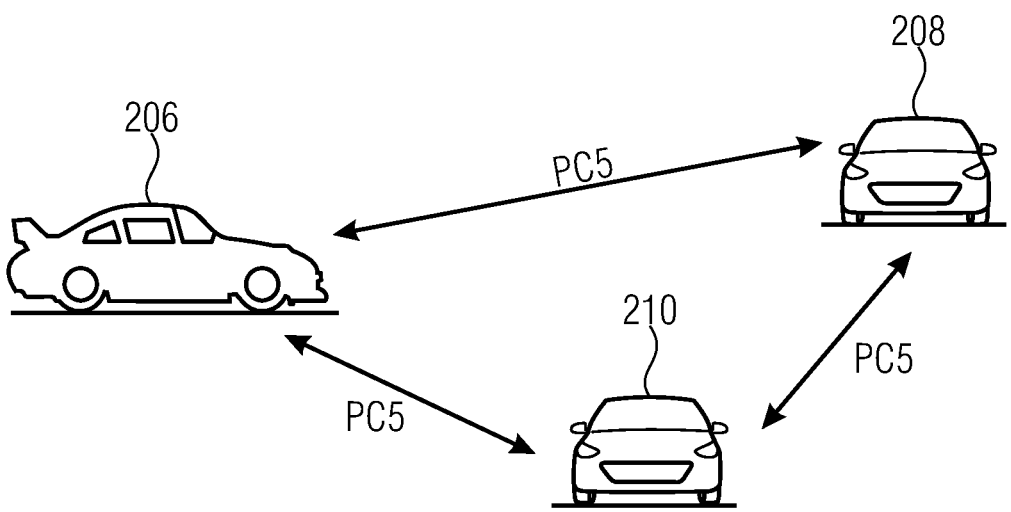
FIG. 3 shows a scenario in which UEs directly communicating with each other are not are not in coverage of a base station, i.e., are not connected to a base station.
Figure 5:
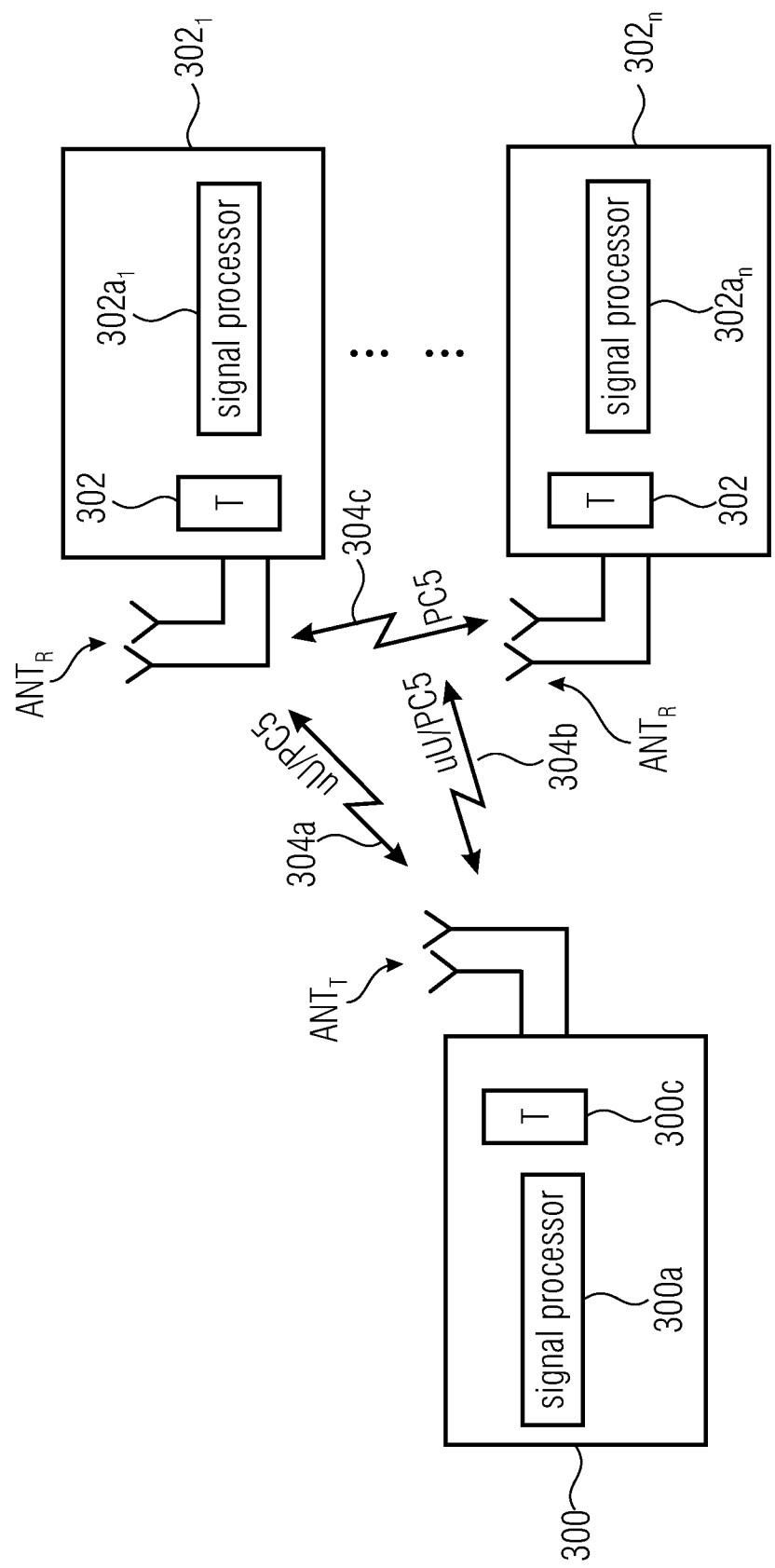
FIG. 5 is a schematic representation of a wireless communication system for communicating information between a transmitter and one or more receivers in accordance with embodiments of the present invention.
Figures 1, 17A:
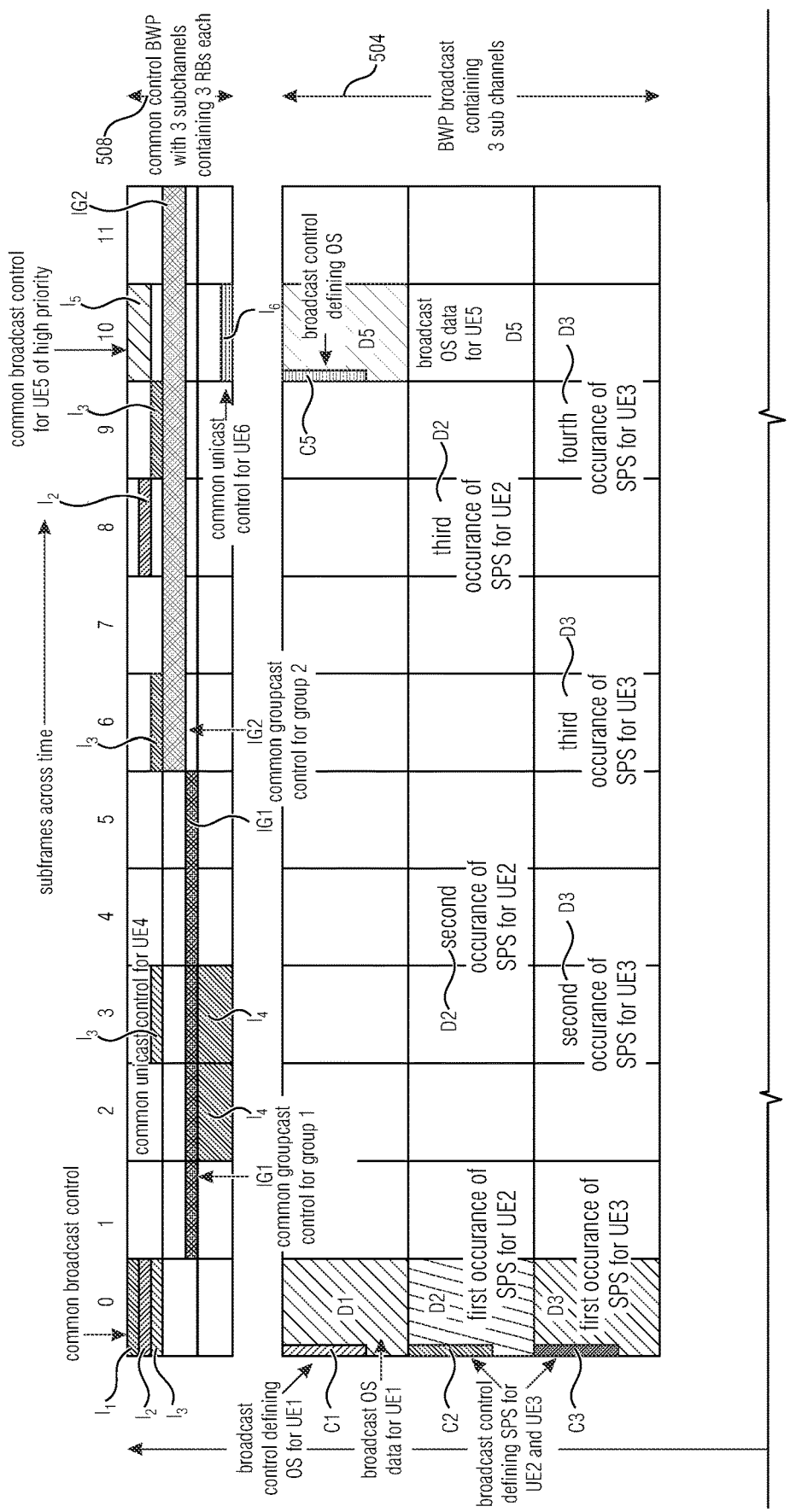
Figures 2, 17A:
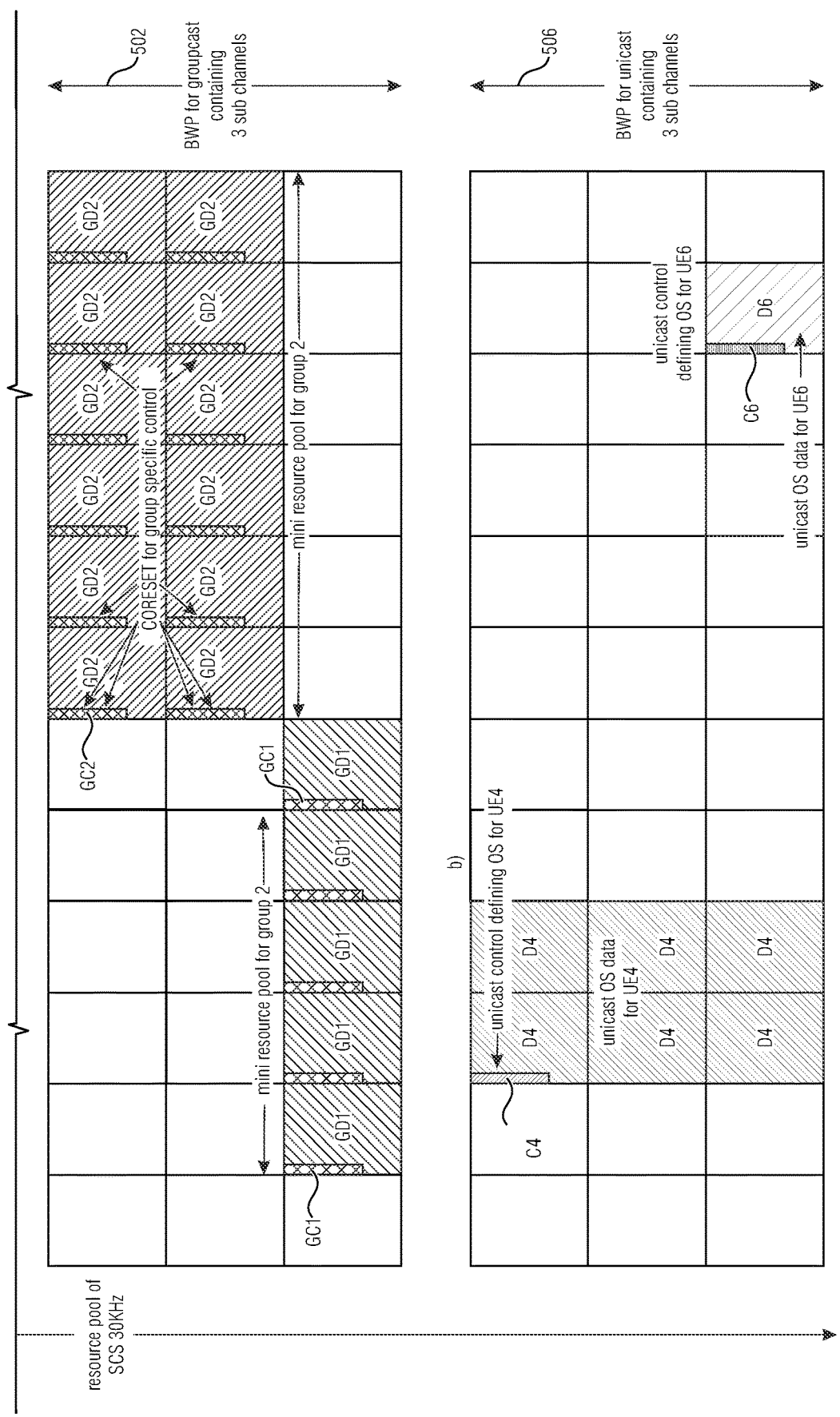

Embodiments of the present invention may be implemented in a wireless communication system as depicted in FIG. 1, FIG. 2 and FIG. 3 including base stations and users, like mobile terminals or IoT devices. FIG. 5 is a schematic representation of a wireless communication system including a transmitter 300, like a base station, and one or more receivers $302_1$ to $302_n$, like user devices, UEs. The transmitter 300 and the receivers 302 may communicate via a wireless communication links or channels 304a, 304b, 304c, like a radio link. The transmitter 300 may include one or more antennas $ANT_T$ or an antenna array having a plurality of antenna elements, a signal processor 300a and a transceiver 300b, coupled with each other. The receivers 302 include one or more antennas $ANT_R$ or an antenna array having a plurality of antennas, a signal processor $302a_1$, $302a_n$, and a transceiver $302b_1$, $302b_n$ coupled with each other. The base station 300 and the UEs 302 may communicate via respective first wireless communication links 304a and 304b, like a radio link using the Uu interface, while the UEs 302 may communicate with each other via a second wireless communication link 304c, like a radio link using the PC5 interface.

The system, the base station 300 and the one or more UEs 302 may operate in accordance with the inventive teachings described herein.

Collision Avoidance—System

The present invention provides a wireless communication system, comprising:
one or more base stations, and
a plurality of user devices, UEs, wherein the plurality of UEs comprises a plurality of first UEs operating in a first mode and a plurality of second UEs operating in a second mode, the first UEs and the second UEs configured for a sidelink communication,
wherein a sidelink transmission comprises a sidelink frame having a control region and a data region,
wherein the control region comprises a first control region and a second control region, the first control region for transmitting control data of a first UE, the second control region for transmitting control data of a second UE, and the first and second control regions including a plurality of a common resources, In accordance with embodiments, a first UE is configured to transmit control data in the first region, and a second UE is configured to transmit control data in the second region.

In accordance with embodiments, a first UE is configured to monitor the first control region to blindly decode control data, and a second UE is configured to sense the control region, e.g., using energy detection and/or to monitor the control region and to blindly decode control data.

In accordance with embodiments, a first UE is configured to
send its control data using one or more common resources in the first control region, and
after sending the control data, start sending the corresponding data in the data region or in the data region and the second control region.

In accordance with embodiments, a first UE is configured to
decode the control data from the first control region and/or the second control region, and
decode the corresponding data at resources in the data region indicated by the control data.

In accordance with embodiments, in case data to be send is associated with a certain service, like an emergency or other low latency service, a first UE is configured to
use any known free or unused common resources so as to send its control data in the first control region and its data both in the second control region and in the data region, or
send its control data in the second control region and its data both in the first control region and in the data region, or
use a procedure like a second UE to find free or unused common resources and use the found free or unused common resources so as to send its control data in the second control region and its data in the data region.

In accordance with embodiments, a second UE is configured to
  sense or blindly decode the first control region to find one or more free or unused common resources,
  send its control data using the one or more free or unused common resources in the second control region,
  after sending the control data, start sending the corresponding data in the data region.

In accordance with embodiments, in case a plurality of free or unused common resources is sensed, a second UE is configured to
  randomly select free or unused common resources for sending its control data in the second control region, or
  rank the free or unused common resources according to one or more predefined parameters, like a received power lever, and select resources for which the one or more predefined parameters meet one or more certain criteria, e.g., exceed a certain threshold or the like.

In accordance with embodiments, a second UE is configured to
  decode the control data from the first control region and/or the second control region, and
  decode the corresponding data at resources in the data region indicated by the control data.

In accordance with embodiments, the plurality of a common resources are part of a set of resources partially or fully shared by the one or more first UEs and the one or more second UEs.

In accordance with embodiments,
  the plurality of common resources comprises one of more subchannels defined by one or more carriers in the frequency domain,
  wherein the first control region spans a first time, the second control region spans a second time, and the data region spans a third time, and
  wherein the control data and the corresponding data is transmitted in the same subchannel.

In accordance with embodiments,
  the plurality of common resources comprises one of more frames defined by one or more symbols in the time domain,
  wherein the first control region spans a first frequency range, the second control region spans a second frequency range, and the data region spans a third frequency range, and
  wherein a first UE is configured to transmit its control data in a first frame, and the data corresponding to the control data in a second frame, the first and second frames being offset in time, and a second UE is configured to transmit its control data in the second frame, and the data corresponding to the control data in the second frame.

In accordance with embodiments, a first UE is configured to
  send its control data in the first control region in the first frame, and
  after sending the control data, start sending the corresponding data in the data region in the second frame.

In accordance with embodiments, a second UE is configured to
  sense the first control region of a first frame to find one or more free or unused common resources,
  responsive to finding one or more free or unused common resources, send its control data using the one or more free or unused common resources in the second control region in the second frame,
  after sending the control data, start sending the corresponding data in the data region of the second frame.

In accordance with embodiments, the first UEs comprise one or more in-coverage UEs, and wherein the second UEs comprise one or more out-of-coverage UEs.

In accordance with embodiments, the first UEs and the second UEs are configured for one or more of
  a one-to-all or broadcast communication,
  a one-to-one or unicast communication,
  a one-to-group or groupcast communication.

Dedicated RPs for Broadcast, Groupcast and Unicast—System

The present invention provides a wireless communication system, comprising:
  a plurality of user devices, UEs, wherein at least some of the UEs are configured for a sidelink communication,
  wherein the wireless communication system is configured to provide a set of resources for the sidelink communication among the UEs, the set of resources including:
    a first subset of resources to be allocated for groupcast transmissions over the sidelink for one or more groups of UEs, a group including two or more UEs, and
    a second subset of resources to be allocated for a broadcast transmission over the sidelink from one or more UEs to all UEs.

In accordance with embodiments the wireless communication system comprises:
  one or more base station,
  wherein the base station is configured to
    divide an entire set of resources allocated to UEs for sidelink communications into the first subset of resources and the second subset of resources, and
    provide the UEs with information about the respective subsets so as to allow the UEs to carry out a broadcast communication or a groupcast communication.

In accordance with embodiments, the base station is configured to provide a UE with information about the respective subsets during an initial access procedure of the UE.

In accordance with embodiments, the base station is configured to
  dynamically modify the subsets based on current requirements of the UEs, or
  modify the subsets in periodic intervals using RRC configurations.

In accordance with embodiments, the subsets of resources include resources adjacent or non-adjacent across frequency, and contiguous or non-contiguous across time.

In accordance with embodiments, the subsets of resources include resources of the same numerology or a plurality of groups of resources having different numerologies.

In accordance with embodiments, the subset of resources define respective resource pools or mini resource pools or a sub-pools.

In accordance with embodiments, the plurality of UEs comprises one or more in-coverage UEs and/or one or more out-of-coverage UEs.

In accordance with embodiments, a groupcast communication for a group including only two members is referred to as a unicast communication.

In accordance with embodiments, the set of resources further includes:

a third subset of resources to be allocated for one or more unicast transmissions over the sidelink from a first UE to a second UE.

Control and Data Association/Longer Data Packets—System

In accordance with embodiments,
some or all of the subsets of resources comprise a plurality of control regions and data regions,
the plurality of control regions are located at certain intervals and each control region is defined in time and in frequency,
wherein the data region associated with a control region follows the control region in time or frequency directly or with an offset and is located at the same frequency or time as the control region In accordance with embodiments, one or more of the control regions include, at a common resource, like a common frequency/frequency band or a common time/frame, at least a first control region and a second control region, and at least a first data region associated with the first control region and a second data region associated with the second control region, and
wherein
the first control region includes control data from a first UE, the second control region includes control data from a second UE, the first data region includes data from the first UE, and the second data region includes data from the second UE, or
the first control region and/or the second control region includes control data from a UE, and the first and second data regions include data from the UE, or
the first control region includes control data from a UE, and the second control region, the first data region and the second data region include data from the UE.

In accordance with embodiments, the first and second control regions are arranged contiguous or with an offset.

FDMed Common Control and TDMed Data BWPs within RP—System

In accordance with embodiments, the base station is configured to provide a further subset of resources for a common control channel, the common control channel spanning across the time or duration of the subsets of resources and including basic information for one or more receiving UEs indicating in which of the subsets of resources data for the one or more receiving UEs is present, each of the subsets of resources including control information for the one or more receiving UEs having further control information regarding the data to be received, and
wherein
the basic information and the data for the one or more receiving UEs are not deferred in time so that the basic information and the data along with the further control information for the one or more receiving UE are present at the same time, e.g., in the same frame or subframe, or
the basic information and the data for the one or more receiving UEs are deferred in time by a certain offset so that the basic information for the one or more receiving UEs is present earlier than the data along with the further control information for the one or more receiving UEs, e.g., in different frames or subframes.

In accordance with embodiments, the UEs are configured to obtain during the initial access process, e.g., via the MIB or the SIB, information about the common control channel and the subsets of resources.

In accordance with embodiments, the UEs are configured to listen to the common control channel at all times, independent of whether a UE is a part of a group, or is carrying out a broadcast.

In accordance with embodiments,
the common control channel includes at least two sub channels, each sub channel corresponding to one of the subsets of resources, and
each sub channel of the common control channel includes a number of resource blocks, the number of resource blocks being equal to or is a multiple of a number of sub channels present in each of the subsets of resources.

In accordance with embodiments each sub channel in each of the subsets of resources has a control region, CORESET, for the further control information, the CORESET mapping to the data within the sub channel in a given subframe for providing the receiving UE with an implicit one-to-one control-data resource mapping, or
wherein each the subset of resources has a single control region, CORESET, for the further control information, the CORESET divided into the number of sub channels in the subsets of resources, and each CORESET division being mapped to a sub channel in a given subframe for providing the receiving UE with an implicit one-to-one control-data resource mapping.

In accordance with embodiments, the CORESET provides a receiving UE with at least one of the further information indicating
whether a transmission is periodic, in which case the UE knows when to expect a next transmissions, wherein subsequent periodic transmissions may or may not contain a CORESET, or
whether a transmission is aperiodic, or
whether transmissions are SPS transmissions, the CORESET including an activation/deactivation parameter, a periodicity and an interval, or
whether a transmission is a one shot transmission, the CORESET defining whether the data is across the entire subset of resources or only over some of the sub channels within the subset of resources.

In accordance with embodiments in which some control is coming from the BS or the Group Leader UE, the activation/deactivation of the SPS transmission may be triggered by that entity, i.e., the BS or the Group Leader UE.

In accordance with embodiments,
a transmitting UE is configured to transmit common control information, CCI, in the common control channel in a given subframe, followed by the transmission of control and/or data in one of the subsets of resources, and
the CCI indicates to which of the subsets of resources the control information pertains so as to allow a receiving UE to decode the further control information in the associated subset of resources.

In accordance with embodiments the position of the CCI may indicate which BWP and sub channel within it contains the CORESET and data. Considering a common control BWP with 3 sub channels, with the first sub channel for broadcast, second for groupcast and the third for unicast, each sub channel has 3 RBs each, indicating 3 sub channels within each data BWP. If, for example, the CCI is send in the first RB of the common control BWP, it implicitly means that the UE has to look for the CORESET and data in the first sub channel of the broadcast BWP.

In accordance with embodiments,
  in the case of a high priority transmission, the CCI contains all relevant information pointing to data directly in the relevant subset of resources
  in the case of groupcast communications, the CCI is transmitted by a lead UE or the transmitting group member and contains information regarding a mini resource pool used for a group that resides within the second subset of resources, and/or the CCI defines a number of sub channels within the second subset of resources for a given group, wherein some or all of the sub channels in each subframe in the mini resource pool have a CORESET,
  if the CCI spans all the number of resource blocks in the common control channel across more than one subframe, it indicates that all the sub channels in the associated subset of resources across the subframes are used for the respective transmission type being groupcast or broadcast.
  in case CCIs have attached a priority, a receiving UE decides based on the priority attached to each of the CCIs which data it decodes.

In accordance with embodiments any UE (broadcast, groupcast or unicast) which transmits a CCI spanning all the RBs in the respective sub channel in the common control channel, indicates that it will be transmitting data in all the sub channels within the respective data BWP. This may also span across multiple subframes as well. Even in the case of groupcast, if the lead UE sends out a CCI across the RBs of the groupcast sub channel, it means that the said group will be having a mini resource pool spanning the sub channels of the groupcast BWP.

In accordance with embodiments, in the case of groupcast communications, the lead UE or a transmitting group member transmits the CCI at predefined and/or regular time instances/intervals.

In accordance with embodiments, a receiving UE is configured to decode the CCI, and, in case the decoded CCI pertains to the receiving UE, decode the further control information in the associated subset of resources to obtain detailed information for the UE to receive the data successfully.

In accordance with embodiments, in case the basic information and the data for the one or more receiving UEs are not deferred in time, the receiving UE is configured to
  while decoding the CCI, buffer he contents of all subsets at this time,
  in case the decoded CCI pertains to the receiving UE, decode the data in the associated subset of resources and discard the reset, and
  in case the decoded CCI does not pertain to the receiving UE, clear the buffer.

In accordance with embodiments, in case the basic information and the data for the one or more receiving UEs are deferred in time, the receiving UE is configured to
  decode the CCI,
  in case the decoded CCI pertains to the receiving UE, decode the data in the associated subset of resources in the time deferred frame, and
  in case the decoded CCI does not pertain to the receiving UE, to carry on to the next frame.

In accordance with embodiments, the UE comprises one or more of
  a mobile terminal, or
  stationary terminal, or
  cellular IoT-UE, or
  vehicular UE, or
  an IoT or narrowband IoT, NB-IoT, device, or
  a ground based vehicle, or
  an aerial vehicle, or
  a drone, or
  a moving base station, or
  road side unit, or
  a building, or
  any other item or device provided with network connectivity enabling the item/device to communicate using the wireless communication network, e.g., a sensor or actuator, and
wherein the base station comprises one or more of
  a macro cell base station, or
  a small cell base station, or
  a central unit of a base station, or
  a distributed unit of a base station, or
  a road side unit, or
  a UE, or
  a remote radio head, or
  an AMF, or
  an SMF, or
  a core network entity, or
  a network slice as in the NR or 5G core context, or
  any transmission/reception point, TRP, enabling an item or a device to communicate using the wireless communication network, the item or device being provided with network connectivity to communicate using the wireless communication network.

In accordance with embodiments, the frame comprises a transmission time interval or a certain interval for which the apparatus reserved resource, like a subframe, a TTI, a slot, and/or a mini-slot.

USER DEVICE/BASE STATION

Collision Avoidance—UE/BS

The present invention provides a user device, UE, for a wireless communication system having one or more base stations, and a plurality of user devices, UEs,
  wherein the UE is configured to operate in a first mode or in a second mode,
  wherein the UE is configured for a sidelink communication with a one or more UEs, one or more UEs including UEs operating in the first mode and/or UEs operating in the second mode,
  wherein a sidelink transmission comprises a sidelink frame having a control region and a data region,
  wherein the control region comprises a first control region and a second control region, the first control region for transmitting control data of a first UE, the second control region for transmitting control data of a second UE, and the first and second control regions including a plurality of a common resources.

The present invention provides a base station for a wireless communication system having one or more base stations, and a plurality of user devices. UEs, the UEs configured to operate in a first mode or in a second mode and for a sidelink communication with one or more of UEs, the one or more UEs including UEs operating in the first mode and/or UEs operating in the second mode,
  wherein a sidelink transmission comprises a sidelink frame having a control region and a data region,
  wherein the control region comprises a first control region and a second control region, the first control region for transmitting control data of a first UE, the second control region for transmitting control data of a second UE, and the first and second control regions including a plurality of a common resources.

Dedicated RPs for Broadcast, Groupcast and Unicast—UE/BS

The present invention provides a user device, UE, for a wireless communication system having one or more base stations, and a plurality of user devices, UEs,
wherein the UE is configured for a sidelink communication,
wherein the UE is configured to use a set of resources for the sidelink communication among the UEs, the set of resources including:
a first subset of resources to be allocated for groupcast transmissions over the sidelink for one or more groups of UEs, a group including two or more UEs, and
a second subset of resources to be allocated for a broadcast transmission over the sidelink from one or more UEs to all UEs.
In accordance with embodiments
some or all of the subsets of resources comprise a plurality of control regions and data regions,
the plurality of control regions are located at certain intervals and each control region is defined in time and in frequency,
wherein the data region associated with a control region follows the control region in time or frequency directly or with an offset and is located at the same frequency or time as the control region.
In accordance with embodiments
the UE is configured to use a further subset of resources for a common control channel, the common control channel spanning across the time or duration of the subsets of resources and including basic information for one or more receiving UEs indicating in which of the subsets of resources data for the one or more receiving UEs is present, each of the subsets of resources including control information for the one or more receiving UEs having further control information regarding the data to be received, and
wherein
the basic information and the data for the one or more receiving UEs are not deferred in time so that the basic information and the data along with the further control information for the one or more receiving UE are present at the same time, e.g., in the same frame or subframe, or
the basic information and the data for the one or more receiving UEs are deferred in time by a certain offset so that the basic information for the one or more receiving UEs is present earlier than the data along with the further control information for the one or more receiving UEs, e.g., in different frames or subframes.

The present invention provides a base station for a wireless communication system having one or more base stations, and a plurality of user devices, UEs, wherein at least some of the UEs are configured for a sidelink communication,
wherein the base station is configured to provide a set of resources for the sidelink communication among the UEs, the set of resources including:
a first subset of resources to be allocated for groupcast transmissions over the sidelink for one or more groups of UEs, a group including two or more UEs, and
a second subset of resources to be allocated for a broadcast transmission over the sidelink from one or more UEs to all UEs.
In accordance with embodiments,
some or all of the subsets of resources comprise a plurality of control regions and data regions,
the plurality of control regions are located at certain intervals and each control region is defined in time and in frequency,
wherein the data region associated with a control region follows the control region in time or frequency directly or with an offset and is located at the same frequency or time as the control region
In accordance with embodiments,
the base station is configured to provide a further subset of resources for a common control channel, the common control channel spanning across the time or duration of the subsets of resources and including basic information for one or more receiving UEs indicating in which of the subsets of resources data for the one or more receiving UEs is present, each of the subsets of resources including control information for the one or more receiving UEs having further control information regarding the data to be received, and
wherein
the basic information and the data for the one or more receiving UEs are not deferred in time so that the basic information and the data along with the further control information for the one or more receiving UE are present at the same time, e.g., in the same frame or subframe, or
the basic information and the data for the one or more receiving UEs are deferred in time by a certain offset so that the basic information for the one or more receiving UEs is present earlier than the data along with the further control information for the one or more receiving UEs, e.g., in different frames or subframes.

METHODS

The present invention provides a method for a sidelink communication in a wireless communication system having one or more base stations, and a plurality of user devices, UEs, wherein the plurality of UEs comprises a plurality of first UEs operating in a first mode and a plurality of second UEs operating in a second mode, the first UEs and the second UEs configured for a sidelink communication, the method comprising:
performing a sidelink transmission using a sidelink frame having a control region and a data region,
wherein the control region comprises a first control region and a second control region, the first control region for transmitting control data of a first UE, the second control region for transmitting control data of a second UE, and the first and second control regions including a plurality of a common resources.

The present invention provides a method for a sidelink communication in a wireless communication system having one or more base stations, and a plurality of user devices, UEs, wherein at least some of the UEs are configured for a sidelink communication, the method comprising:

providing a set of resources for the sidelink communication among the UEs, the set of resources including:
- a first subset of resources to be allocated for groupcast transmissions over the sidelink for one or more groups of UEs, a group including two or more UEs, and
- a second subset of resources to be allocated for a broadcast transmission over the sidelink from one or more UEs to all UEs.

In accordance with embodiments
some or all of the subsets of resources comprise a plurality of control regions and data regions,
the plurality of control regions are located at certain intervals and each control region is defined in time and in frequency,
wherein the data region associated with a control region follows the control region in time or frequency directly or with an offset and is located at the same frequency or time as the control region.

In accordance with embodiments, the method comprises providing a further subset of resources for a common control channel, the common control channel spanning across the time or duration of the subsets of resources and including basic information for one or more receiving UEs indicating in which of the subsets of resources data for the one or more receiving UEs is present, each of the subsets of resources including control information for the one or more receiving UEs having further control information regarding the data to be received, wherein
- the basic information and the data for the one or more receiving UEs are not deferred in time so that the basic information and the data along with the further control information for the one or more receiving UE are present at the same time, e.g., in the same frame or subframe, or
- the basic information and the data for the one or more receiving UEs are deferred in time by a certain offset so that the basic information for the one or more receiving UEs is present earlier than the data along with the further control information for the one or more receiving UEs, e.g., in different frames or subframes.

COMPUTER PROGRAM PRODUCT

The present invention provides a computer program product comprising instructions which, when the program is executed by a computer, causes the computer to carry out one or more methods in accordance with the present invention.

In- and Out-of-Coverage Collision Avoidance Design

Subsequently, embodiments of the first aspect of the present invention are described in more detail. In accordance with embodiments of the first aspect, a sidelink frame to be used for a sidelink transmission may be provided, and the sidelink frame may have a control region and a data region. The sidelink frame may be defined by the transmission time interval for transmitting data from the first UE via the sidelink to the second UE, or it may be considered the time interval the resources for the transmission have been reserved by the system. For example, the sidelink may be a sub-frame including a plurality of symbols in the time domain and a plurality of sub-carriers in the frequency domain, or it may refer to a transmission time interval as mentioned above, or to a slot including a plurality of symbols used for a sidelink communication, or a mini-slot.

In accordance with embodiments of the first aspect, to provide for a collision avoidance, the control region of the sidelink frame is divided into a plurality of control regions, for example into a first control region and into a second control region. The first control region is used by UEs operating in a first mode, e.g., in-coverage UEs, for transmitting their control data while the second control region is used by UEs operating in a second mode, e.g., out-of-coverage UEs, for controlling their control data. The following description of embodiments will be made with reference to in-coverage UEs and out-of-coverage UEs, however, the present invention is not limited to such embodiments, In accordance with other embodiments, The UEs may operate in other modes, e.g. in-coverage but not under control of a base station or network or in-coverage but in mode 2 with some aids with respect to resource allocation or selection of a base station or network. The respective first and second control regions are defined by a plurality of common resources in the sidelink frame which, in case of a time multiplex design are respective frequency bands or sub-channels in the frequency domain, and in case of a frequency multiplex design, the common resources are time periods in the time domain, like the duration of the frame in the time domain.

Figure 6:
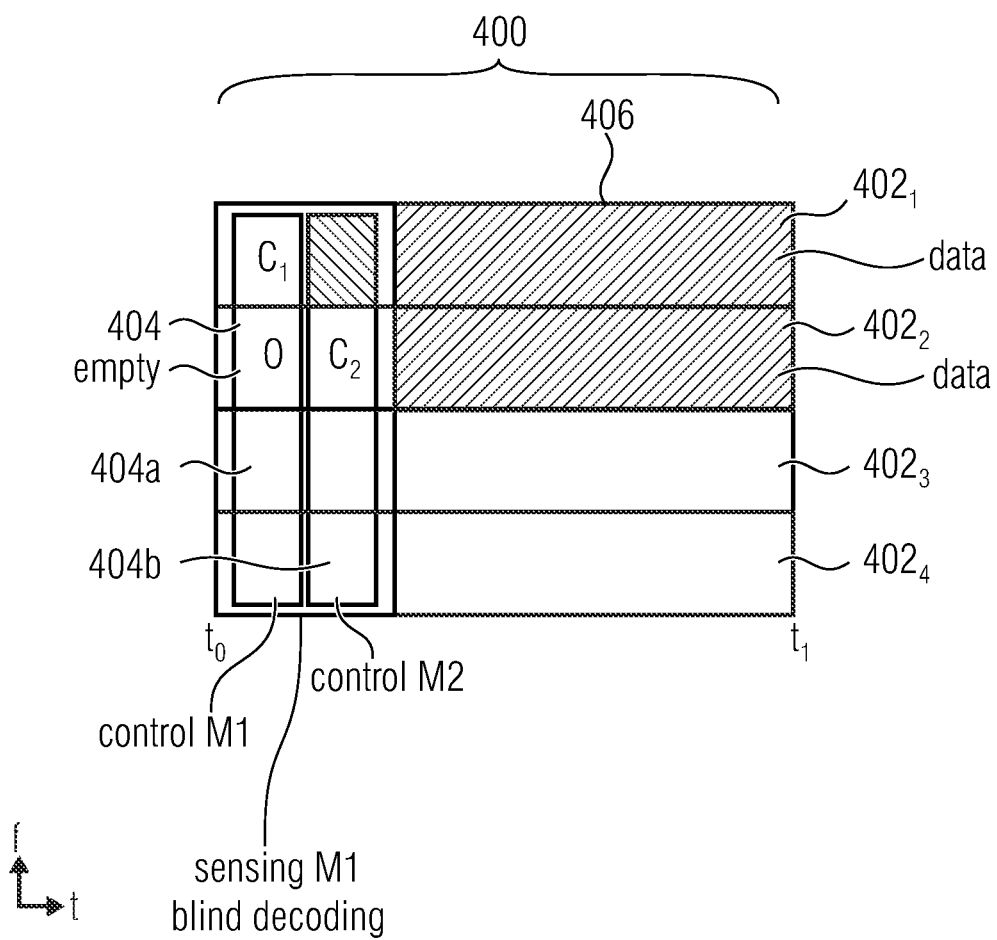
FIG. 6 illustrates an embodiment of the first aspect of the present invention implementing the inventive approach in a time division multiplexed design.

FIG. 6 illustrates an embodiment of the first aspect of the present invention implementing the inventive approach in a time division multiplexed design. FIG. 6 illustrates an embodiment of a sidelink frame 400 having a certain duration in the time domain t and a certain extension in the frequency domain f. More specifically, the sidelink frame 400 comprises a plurality of sub-channels $402_1$ to $402_4$ having a certain bandwidth in the frequency domain, which may be the same for each sub-channel or which may be different for the sub-channels. The frame 400 includes the plurality of sub-channels $402_1$ to $402_4$ which extend from an initial time $t_0$ to a time $t_1$ defining the duration of the frame 400. During the sidelink communication, once the frame 400 is transmitted, a new frame having the same structure may be transmitted for the next communication by a UE over the sidelink.

The frame 400 includes a control region 404 as well as a data region 406. The control region is divided into a first control region 404a and into a second control region 404b. The control region 404a is assigned to in-coverage UEs, also referred to as M1 UEs, i.e., UEs operating in accordance with mode 1 of the NR standard or mode 3 of the LTE standard, and the second control region 404b is assigned to out-of-coverage UEs, also referred to as M2 UEs operating in the M2 mode according to the NR standard or in accordance with the mode 4 of the LTE standard. FIG. 6 illustrates an embodiment in which a M1 UE performs a sidelink communication using the sidelink frame 400. The M1 UE places its control information C1 in the first control section 404a of the control region 404 of the frame 400 followed by its data D1. In accordance with embodiments, the data D1 may only be placed in the resources defining the data region 406 in the sub-channel $402_1$ associated with the area where the control information C1 has been placed, while in accordance with other embodiments, as depicted in FIG. 6, also the area in sub-channel $402_1$ which is defined to be the second control region 404b may be used for data transmission because only the M1 UE transmits data so that the resources in the second control region 404a are free or unused and may also be employed for transmitting data by the M1 UE.

FIG. 6 illustrates the situation in which a M2 UE also transmits using the side frame 400. Before starting transmission, the M2 UE senses the resources associated with the first control region 404a of the control region 404 in the side frame 400 so as to find free or unused resources. In the embodiment depicted in FIG. 6, the resources in the first control region 404a associated with the first sub-channel $402_1$ are occupied by the transmitting M1 UE, however, the resources in the first control region 404a in the second, third and fourth sub-channels are unused or free. The M2 UE, responsive to the sensing of the free or unused resources may select any one of the sub-channels $402_2$ to $402_4$ for the transmission of the control and data. For example, the resources to be used may be selected randomly. In other embodiments, the free or unused common resources may be ranked according to one or more predefined parameters, like a received power level evaluated at a time instance or a received power level averaged over a predefined time period, and resources for which the one or more predefined parameters meet one or more certain criteria, e.g., exceed a certain threshold or the like, may be selected. In the embodiment depicted in FIG. 6, it is assumed that the M2 selected the second sub-channel $402_2$ for the transmission and places its control data C2 into the corresponding second control region 404a of the control region 400 followed by the sending of its data D2 in the sub-channel $402_2$ in the data region 406.

An advantage in accordance with the embodiment of FIG. 6 is that data of the M1 or M2 UE may be transmitted immediately following the transmission of the control data, i.e., data is transmitted without delay immediately following the transmission of the control data.

In the wireless communication system using the frame structure 400 as depicted in FIG. 6 any UE, namely an M1 UE or a M2 UE, which is receiving the frame 400 may decode the data from the control region 404 so as to determine as to whether the data D1 or D2 is dedicated for the receiving UE, and following a successful decoding of the first and/or second control information C1, C2, indicating that data D1 and/or data D2 is directed to the receiving UE, the data D1 and/or D2 is decoded by the receiving UE.

The embodiment described with reference to FIG. 6 was directed to a TDM design of the frame 400, however, the present invention is not limited to such a design, rather, the inventive concept in accordance with the first aspect of the present invention may also be employed for a frequency domain multiplex, FDM, design. FIG. 7 illustrates embodiments of the first aspect of the present invention for implementing an FDM collision avoidance scheme for sidelink communications.

Figure 7A:
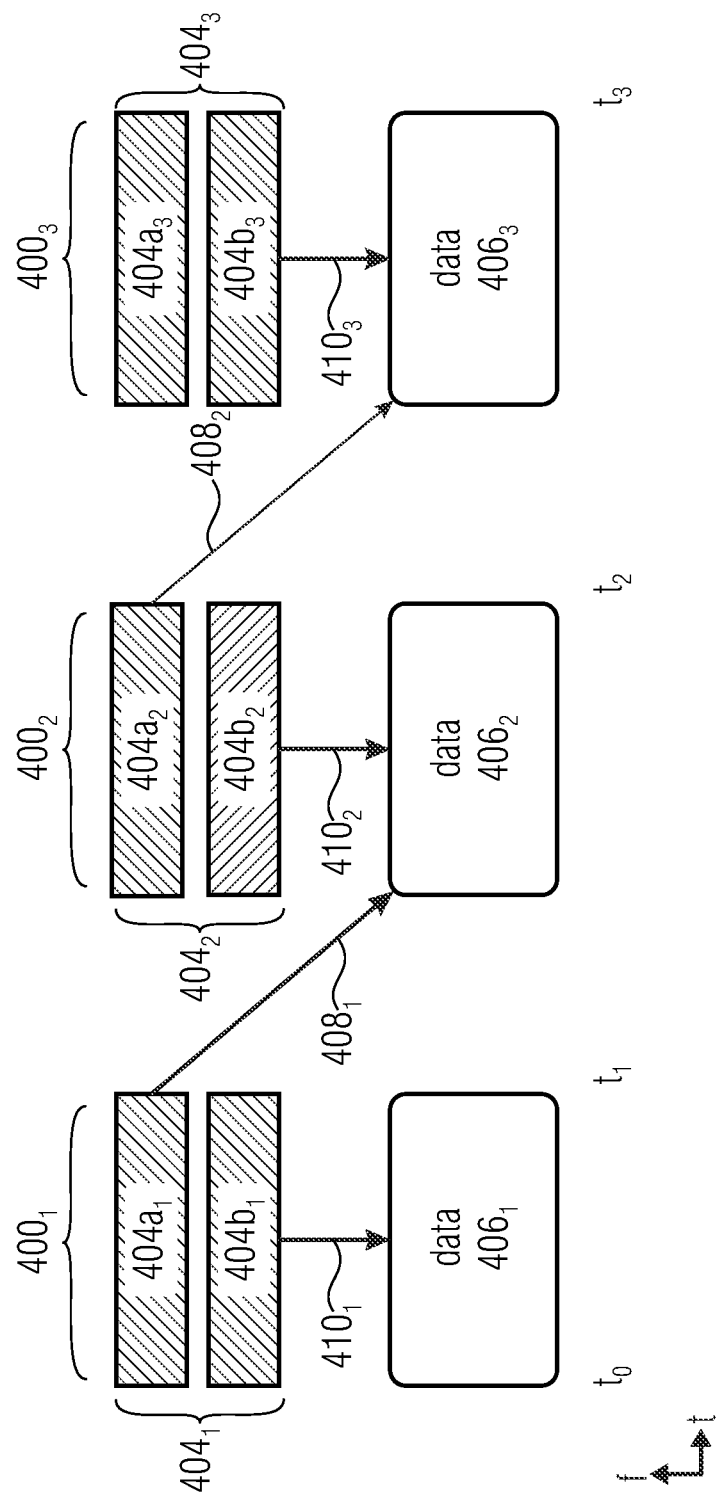
FIGS. 7A and 7B illustrates embodiments of the first aspect of the present invention for implementing a FDM collision avoidance scheme for sidelink communications.

FIG. 7A illustrates a plurality of sidelink frames $400_1$ to $400_3$ including respective control regions $404_1$ to $404_3$ and respective data regions $406_1$ to $406_3$. The respective sidelink frames $400_1$ to $400_3$ have a certain duration in the time so that a first frame extends from a time $t_0$ to a time $t_1$, the second frame $400_2$ extends from the time $t_1$ to the time $t_2$, and the third frame $400_3$ extends from the time $t_2$ to the time $t_3$. Each of the frames extends also in the frequency domain f, and, other than in the TDM case, in the FDM case, the common resources mentioned above is the time duration of the frame, whereas the control region 404 and the data region 406 are placed in different frequency bands or employ different sets of sub-channels. In a similar way as described above with reference to FIG. 6, also in the FDM case, the respective control regions $404_1$ to $404_3$ are divided into a plurality of control regions, namely respective first control regions $404a_1$ to $404a_3$ and second control regions $404b_1$ to $404b_3$. Again, the first control regions are assigned for control information from M1 UEs, and the second control regions $404b$ are assigned to receive control information from M2 UEs.

When employing the FDM design, in accordance with embodiments, the data associated with a certain control information is not transmitted in the same frame but is delayed by at least one frame. This is indicated in FIG. 7A by the respective arrows $408_1$ and $408_2$ indicating the relationship between the respective first control regions $404a_1$ and $404a_2$ with the data regions in the subsequent frames, namely data regions $406_2$ and $406_3$ respectively. On the other hand, data associated with M2 UEs, i.e., data associated with control information in the second control region $404b_1$ to $404b_3$ will be transmitted in the same frame as is indicated by the arrows $410_1$ to $410_3$.

Figure 7B:
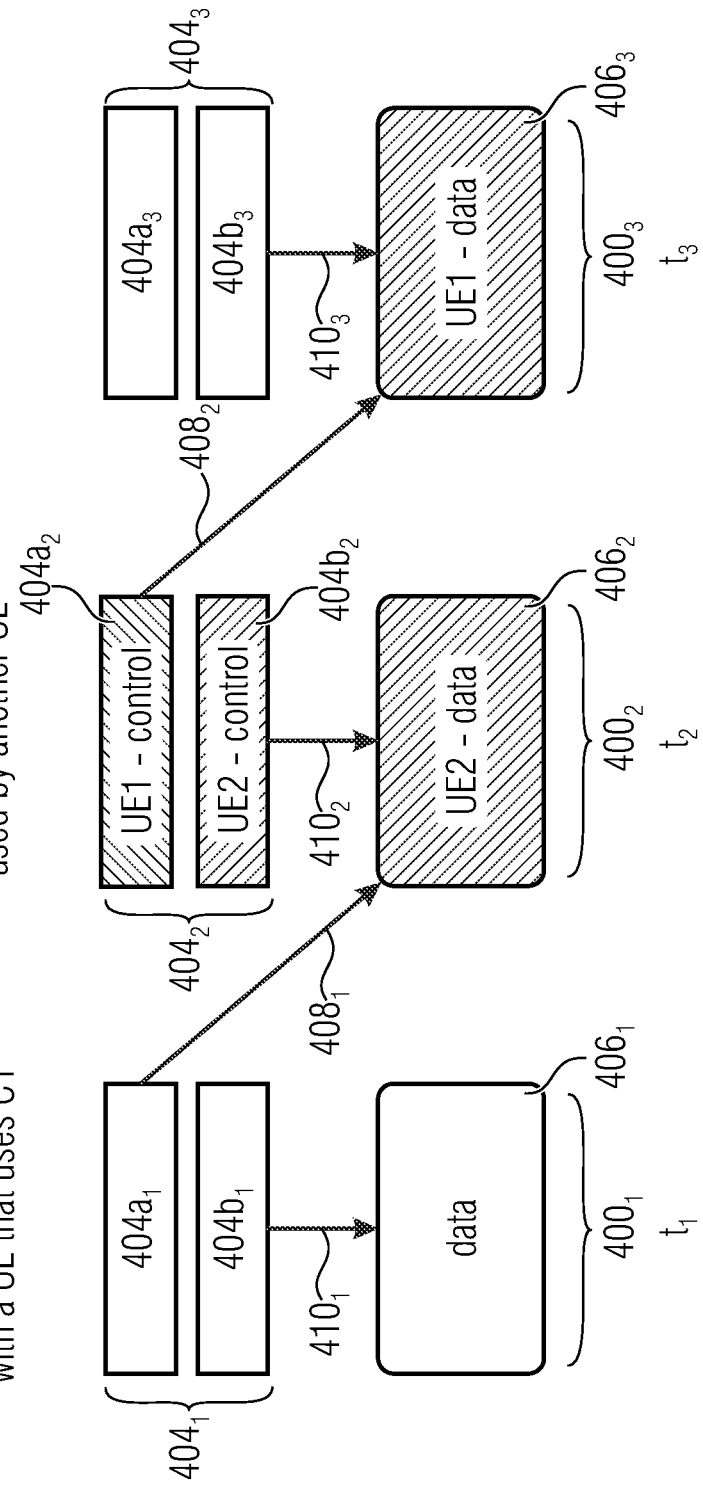

FIG. 7B illustrates an example for sensing and collision avoidance in accordance with embodiments of the first aspect employing the FDM design of FIG. 7A. At a time $t_1$ a M2 UE performs a sidelink transmission using the sidelink frame in accordance with the inventive approach, and it senses the control region $404_1$ of the frame $400_1$ and sees that the first control region $404a_1$ is empty, i.e., the resources are not used by a M1 UE for a transmission of control data meaning that the data region in the next channel $402_2$ includes free/unused resources. Thus, the M2 UE may use control region $404b_2$ in the next frame $400_2$ at the time $t_2$ without colliding with any UE that uses the first control region $404a_1$ in the current frame. At the time $t_2$, the M2 UE places its control information in the second control region $404b_2$ followed by its data in the data region $406_2$. A M1 UE which is to transmit via the sidelink may use at $t_2$ the first control region $404a_2$ to place its control data causing a transmission of its user data in data region $406_3$ in the next frame $400_3$. A further M2 UE that is to transmit over the sidelink will see at $t_2$ that there are no free or unused resources available in the first control section $404a_2$ meaning that in the next frame the data region $406_3$ is occupied by a transmission of M1 UE data, so that the further M2 UE will not transmit but has to wait until a free or unused first control region may be found so that resources for the data transmission of the M2 UE are available in the subsequent frame.

In accordance with further embodiments implementing the collision avoidance scheme described above with reference to FIGS. 6 and 7, a M1 UE may receive data associated with a certain service requiring a high priority transmission or a low latency transmission or the like of the data, for example an emergency message or data related to a URLLC service. In such a situation, the M1 UE may select, in the TDM case of FIG. 6 any available sub-channel having free resources for the data transmission, and in the FDM case, a free second control region for placing its control information so that the data packet may be transmitted immediately in the same frame. For example, the M1 UE may select any known free or unused common resources so as to send its control data in the first control region and its data both in the second control region and in the data region, or send its control data in the second control region and its data both in the first control region and in the data region. In other embodiments, the M1 UE may use a procedure like a M2 UE to find free or unused common resources and use the found free or unused common resources so as to send its control data in the first control region and its data both in the second control region and in the data region.

Dedicated Resources for Broadcast and Groupcast

In accordance with another aspect of the present invention, for sidelink communications of user devices in the wireless communication network, rather than only providing dedicated resources for the broadcast, also dedicated resources for the groupcast are provided. More specifically, as mentioned above, the base station, for example, in LTE, provides the UEs with information regarding a resource pool or a set of resources that is selected from the resources available at the base station, and that is to be used only for broadcast communication over the sidelink interface. For UEs being in coverage, the base station provides the UEs with the information about the resource pool, and it may also provide configuration information of the resource pool to be used by UEs when being out of coverage so that the resources for the sidelink transmissions need to be allocated autonomously. The probability of two UEs, either in coverage or out of coverage, selecting the same resource for a sidelink transmission is high thereby causing a resource allocation collision.

To address this issue, in accordance with the present invention, embodiments of the above-mentioned aspect divide an entire set of resources, like a resource pool or bandwidth part, that is to be used for user devices to carry out a sidelink communication, like a V2X communication, dependent on the communication type, namely dependent on whether a broadcast communication is to be carried out or a group cast communication. In other words, at least a first set of resources for broadcast communication and a second set of resources for groupcast communication is provided. In accordance with embodiments, the division of the available set of resources may be carried by the base station which may provide the user devices with one or more resources from a subset so as to allow a user device to carry out a broadcast communication or a groupcast communication using resources from the respective subset of resources or resource pool.

In accordance with embodiments, this information may be provided by the base station to a user device during an initial access procedure of the user device. A set of resources or resource pools for broadcast communication and groupcast communication may be dynamic dependent on the current requirements of the user devices, for example dependent on an estimated amount of broadcast communications and groupcast communications. The set of resources may be dynamically adjusted, for example, they may be revised in periodic intervals using, for example, RRC configurations. The resources may be adjacent or non-adjacent across frequency and continuous or non-continuous across time. In other words, a broadcast communication resource pool and/or a groupcast communication resource pool may comprise respective resources from different parts of the entire set of available resources for the sidelink communication, and the actual resources may be selected and signaled by the base station.

Figure 8:
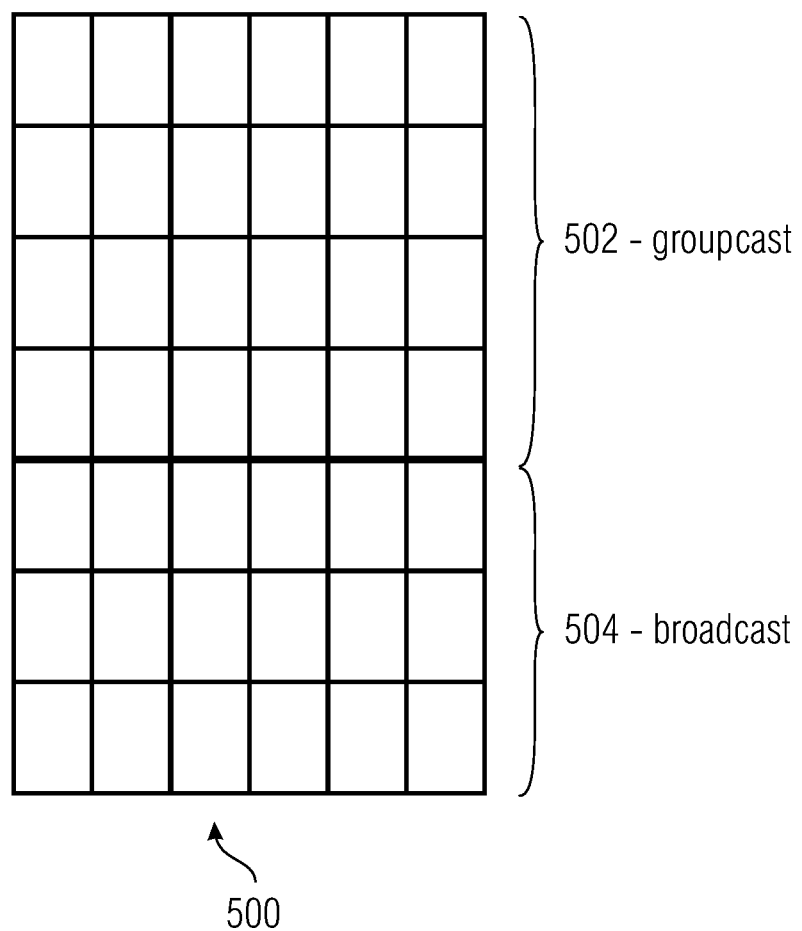
FIG. 8 shows an embodiment of the second aspect of the present invention using dedicated resources for broadcast and groupcast communications over sidelink interfaces in the wireless communication system.

FIG. 8 shows an embodiment of the second aspect of the present invention using dedicated resources for broadcast and groupcast communications over sidelink interfaces in the wireless communication system. FIG. 8 illustrates schematically an entire set of resources 500 that may be available at a base station for sidelink communications within the coverage area of the base station or within another area of the wireless communication network. In accordance with the inventive approach, the available resources 500 include a first subset or a first resource pool or a first BWP 502 dedicated for groupcast communications, and a second subset or second resource pool or a second BWP 504 including resources dedicated for broadcast communications. It is noted that FIG. 8 is just an example of how the resource pool 500 may be used for selecting dedicated resources for groupcast/broadcast communications. The respective resources do not need to be adjacent in frequency and across time. Moreover, not all of the resources available from the resource pool 500 need to be dedicated for groupcast/broadcast communications as depicted in FIG. 8, rather, some resources may not be assigned at a certain time so as to have a reserve of resources which may be assigned to one or both of the groupcast/broadcast communication resource pools during a dynamic adjustment dependent on the requirement, for example, in case additional resources are needed, like in case of an increase in communication traffic over the sidelink. Moreover, in accordance with embodiments to be described later, the additional resources may be used to define a common control channel.

In addition to the above-mentioned groupcast and broadcast communications, there also is the unicast communication in which one UE directly transmits to a dedicated UE over the sidelink. In accordance with embodiments, a unicast communication may be considered a special case of a groupcast communication, in which the group only includes two members, namely the transmitting UE and the receiving UE. In such scenarios, resources for a groupcast communication may be used by UEs for a unicast communication.

Figure 9A:
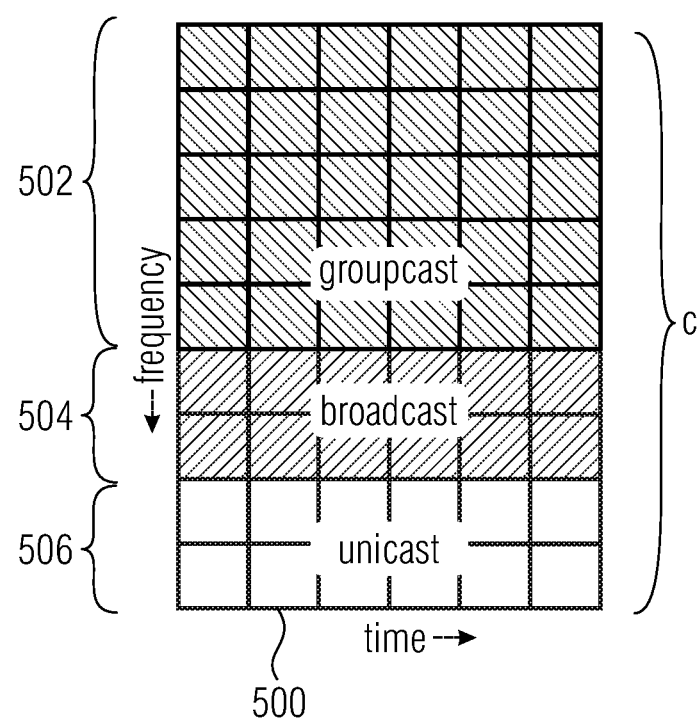
FIG. 9A and 9B illustrates a further embodiment of the second aspect of the present invention in accordance with which the available resources for sidelink communications include an additional resource pool including resources to be used for unicast communications.

In accordance with yet other embodiments, in addition to the above-described groupcast communication resource pool 502 and the broadcast communication resource pool 504, an additional resource pool for a unicast communication may be provided. FIG. 9 illustrates a further embodiment of the second aspect of the present invention in accordance with which the available resources 500 for sidelink communications include, in addition to the groupcast resource pool or BWP 502 and the broadcast resource pool or BWP 504 a third set of resources or resource pool or BWP 506 including resources to be used for unicast communications. FIG. 9A illustrates an embodiment in which the available resources 500 for the sidelink communications are divided into the groupcast resource pool or BWP 502, the broadcast resource pool or BWP 504 and the unicast resource pool or BWP 506. It is noted that the subsequent description of embodiments of the present invention will be made with reference to a groupcast pool 502, a broadcast pool 504 and a unicast pool 506, however, as mentioned above, the inventive approach is not limited to the use of three resource pools, rather, only the groupcast pool and the broadcast pool 502, 504 may be provided, and unicast transmissions may be handled as a subcase of groupcast communications, namely as a communication within a group existing only of two UEs. Thus, the subsequent description of the advantageous embodiment equally applies to cases in which no dedicated unicast communication pool is provided.

FIG. 8 and FIG. 9A indicated the resources in the overall resource pool 500 quite generally and also as being adjacent in a frequency and continuous in time, however, as mentioned above, this is only one possibility for selecting the resources. Actually, any of the resources from the resource pool 500 may be assigned to any one of the resource pools 502 to 506.

Figure 9B:
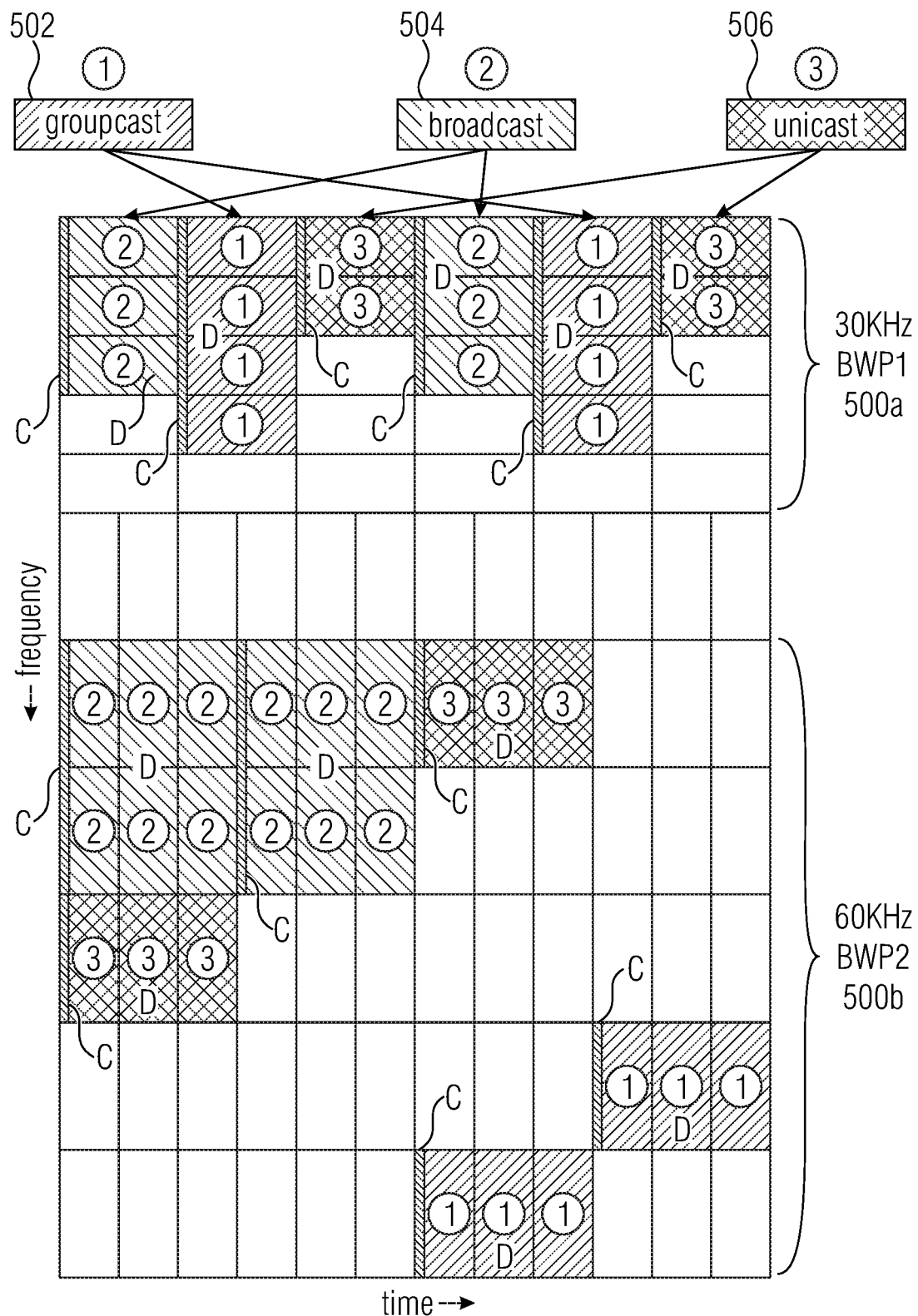

FIG. 9B shows an embodiment of assigning resources from the overall resource pool 500 to the respective resource pools. FIG. 9B illustrates the overall resource pool 500 defining the resources available for a sidelink communication of the UEs. The resource pool 500 includes two groups of resources with different numerology, namely a group 500a of resources having a first subcarrier spacing of 30 kHz, also referred to as bandwidth part BWP1, and a second group 500b of resources having a 60 kHz subcarrier spacing, referred to as bandwidth part BWP2. FIG. 9B indicates at the top that the resources for groupcast communication are indicated by ①, resources for a broadcast communication are indicated by a ②, and resources for a unicast communication are indicated by a ③. In the respective bandwidth parts BWP1 and BWP2, some or all of the available resources are assigned either to the groupcast communication, the broadcast communication or the unicast communication, as is indicated in FIG. 9B, by the respective numbers in the boxes representing the resources. Boxes without any number are not allocated to any of the resource pools and may be used for dynamically changing the size or number of resources in one or more of the currently designed resource pools dependent on the requirements, like a traffic increase over the sidelink and the like. As may be seen from FIG. 9B, each of the resource pools 502 to 506 includes resources from the first bandwidth part BWP1 and from the second bandwidth part BWP2. The respective resources of the bandwidth parts BWP1 and BWP2, which are associated with the respective resource pools 502 to 506, include respective control regions C and respective data regions D, which are the regions where control data and user data is transmitted either for a groupcast communication, a broadcast communication or a unicast communication.

Figure 10A:
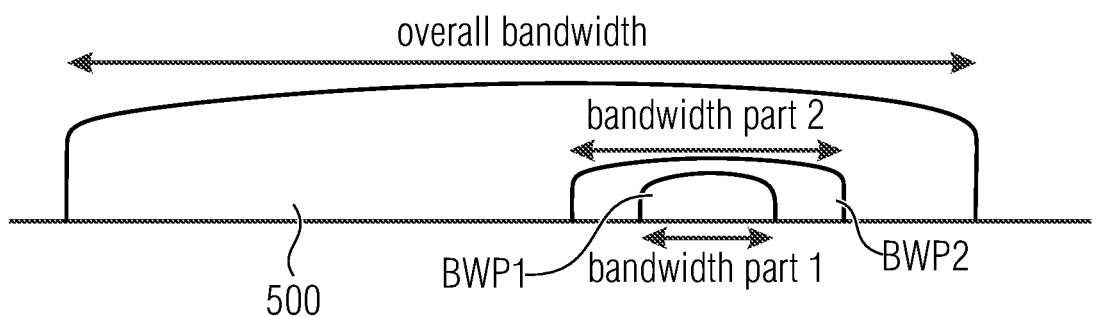
FIG. 10A schematically illustrates the concept of bandwidth parts.

The above-mentioned concept employing different bandwidth parts within the resources 500 available for sidelink communication is now described in more detail with reference to FIGS. 10 and 11. NR 5G systems introduce the concept of bandwidth parts, BWPs. Due to the wide bandwidth operation of NR 5G systems, UEs may only be able to transmit and receive in a frequency range which is a subset of the entire bandwidth. The bandwidth may be adapted according to the throughput that may be used which improves the energy efficiency of the system. In particular, a UE will perform decoding only of a smaller part of the entire bandwidth thereby saving energy and thus battery power, especially since the power consumption of an analog-to-digital converter, ADC, scales with the size of the bandwidth. FIG. 10A schematically illustrates the concept of bandwidth parts and illustrates at 500 the overall bandwidth available, as well as two bandwidth parts BWP1 and BWP2 having a bandwidth being less than the overall bandwidth. Another benefit of the BWP concept is that also UEs having only low bandwidth capabilities are supported on wide band carriers. Moreover, load balancing between the overall transmission bandwidth is improved. A BWP includes a set of continuous resource blocks within the entire bandwidth of the system, and each BWP is associated with a specific numerology, like a sub carrier spacing, SCS, and a respective sidelink prefix. A BWP may be equal or larger than the size of a synchronization sequence, SS, block, also referred to as SSB, and may or may not contain the SSB. A UE may have up to four BWPs configured for the downlink and for the uplink each, however, only one BWP for the uplink and for the downlink may be active at a given point in time.

Figure 10B:
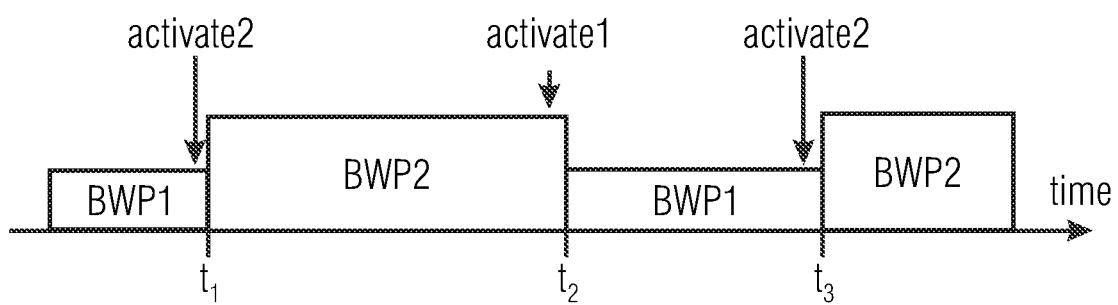
FIG. 10B illustrates the activation of BWPs with different numerologies and/or different bandwidth size.

FIG. 10B illustrates the activation of BWPs with different numerologies and/or different bandwidth size. A first bandwidth part BWP1 of a first, lower bandwidth and a second bandwidth part BWP2 of a higher bandwidth is illustrated. Over the time, responsive to a signaling, like the RRC signaling, the respective BWPs may be activated. In the example of FIG. 10A, initially, the first bandwidth part BWP1 is active. At a time $t_1$, the bandwidth part BWP1 is deactivated and the bandwidth part BWP2 of higher bandwidth is activated, by external signaling, as is schematically illustrated in FIG. 10B by the signal "activate2", meaning that now the bandwidth part BWP2 is to be activated causing a deactivation of the first bandwidth part BWP1. At time $t_2$ the first bandwidth part Is activated once again, and at time $t_3$ the second bandwidth part is activated again. The durations may be the same or different. A BWP may overlap in frequency or may cover different bandwidths. In the downlink, for switching between BWPs, the receiver is provided with some gap time to allow for retuning of the radio front end, RF, as is illustrated in FIG. 10B where it may be seen, that the respective activate signals are received slightly ahead of the actual switching time $t_1$, $t_2$ and $t_3$.

The BWPs may be configured by RRC signaling, and the activation and deactivation may be enabled by PDCCH signaling. The MAC layer may confirm an activation/deactivation using a MAC control element. Also a time-based deactivation may be implemented, to reduce the bandwidth once data transmission is completed and to save signaling overhead. The deactivation may also be provided by a MAC control element that is in the last data packet being transmitted.

For a serving cell, the BWP, where the SSB is transmitted and where system information is received, is referred to as the initial downlink BWP. In the uplink, the initial BWP is the bandwidth over which the RACH is transmitted, and the RACH resources may be configured by the system information. Once multiple BWPs are configured, one of the BWP may be the default BWP which may be used as a fallback or in case an inactivity time expires. In carrier aggregation, CA, or in dual connectivity, DC, the base station may configure at least a first active BWP in the downlink and first active BWP in the uplink.

HARQ retransmissions over the bandwidth parts are possible. Further, the UE may also be active outside the BWP, for example to perform RRM measurements, e.g., to transmit sounding reference signals, SRS. In the active BWP, the UE monitors at least one physical downlink control channel for which control element resources, CORESETs, are configured.

Figure 11:
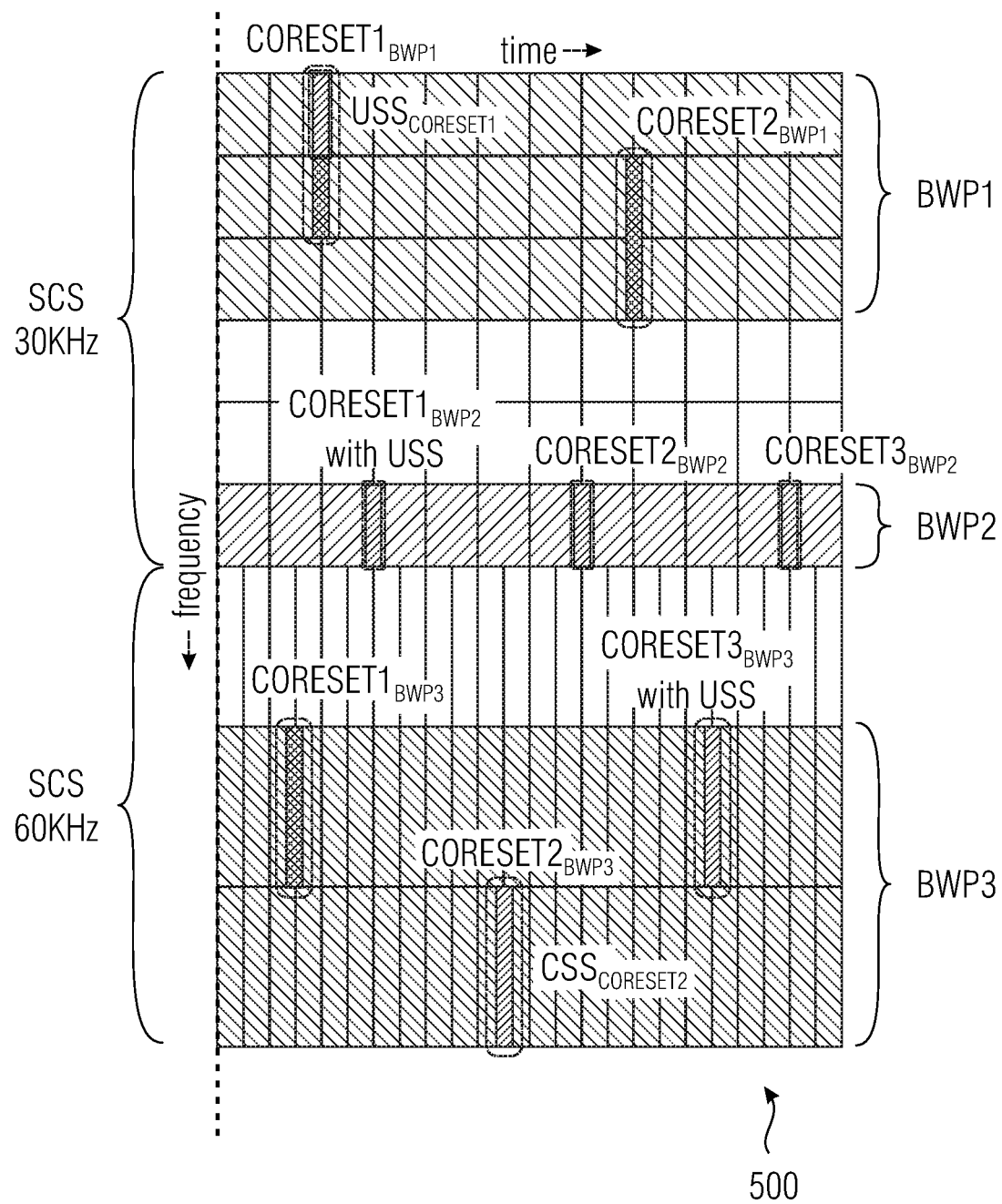
FIG. 11 illustrates an example of bandwidth parts using CORESETs containing user specific and common search spaces.

FIG. 11 illustrates an example of bandwidth parts using CORESETs containing user specific and common search spaces. The frequency domain extends along the vertical direction, and the time domain extends the horizontal direction. The overall available bandwidth is schematically indicated at 500, and in the example of FIG. 11 three bandwidth parts BWP1, BWP2 and BWP3 are illustrated of which bandwidth parts BWP1 and BWP2 use a same sub carrier spacing, SCS, of for example 30 kHz, and the third bandwidth part BWP3 uses a sub carrier spacing of 60 kHz. In the example of FIG. 11, the respective bandwidth parts are located along the frequency such that they are separated by a certain bandwidth, however, as illustrated in FIG. 10, and as said above, the bandwidth parts may also be continuous or even overlapping. Each subframe across time may contain a control resource set, CORESET, which is defined in any of the first three symbols of a given subframe. Each of the BWPs contains at least one control resource set, CORESET, with a UE-specific search space, USS. A CORESET may also be configured to contain a common search space, CSS, which besides UE specific signaling may be used for specific purposes such as system information, paging, group information and the like. A USS is the space across time and frequency which a UE monitors for possible reception of control information specifically configured and directed to this very UE. A CSS, on the other hand, is the space across time and frequency which is monitored by the UE for possible reception of control information that is configured to be received or monitored by all UEs. For example, the CSS may be used during the initial exchange of RRC messages before the USS is configured by an RRC reconfiguration message. In case of a carrier aggregation, CA, or a dual connectivity, DC, the active DL-BWP contains at least one CORESET with a CSS.

In the example of FIG. 11, the first BWP BWP1 includes two CORESETs, CORESET1, CORESET2 of which only CORESET1 is partially defining a USS, and no CSS is provided in BWP1. BWP2 includes three CORESETs, CORESET1 to CORESET3 of which CORESET1 is completely used as a USS. Again, no CSS is provided. In BWP3, three CORESETs, CORESETI to CORESET3 are provided of which CORESET2 defines a CSS, and CORESET3 defines a USS.

A UE may be configured with BWPs of different numerologies and therefore different UEs with different numerologies may be scheduled in different frequency parts of the wide band carrier. In the example of FIG. 11, BWP1 and BWP2 are configured with the numerology of a sub carrier spacing of 30 kHz, while BWP3 is configured with the numerology of 60 kHz sub carrier spacing. Although the BWPs are initially configured by RRC signaling, they may be activated or deactivated using DCI signaling as stated above, however, still, the constraint applies that only a single DL or UL BWP may be active at a given point in time.

It is noted that the inventive approach is not limited to the concept of bandwidth parts, rather, the available resources 500 for a sidelink communication may include a plurality of groups of resources, like two, three or more groups of resources having a different numerology, which, in case of bandwidth parts is a different subcarrier spacing. Providing at least two dedicated resource pools, one for groupcast communications and one for broadcast communications reduces the probabilities of UE collisions transmitting over a sidelink as, dependent on the kind of communication. resources from one of the pools is used.

Control and Data Association

As mentioned above, user devices being in-coverage or being out-of-coverage, i.e., M1 or M2 user devices may communicate or transmit using their sidelink interface, so that there is not necessarily any master allocation entity that may be used for providing an association between control data and user data sent by the user devices, especially in the case of out-of-coverage user devices. Therefore, embodiments of the present invention provide an approach in accordance with which in the respective resource pools for groupcast and broadcast communications, and, if provided, also in the resource pool for unicast communications, a plurality of control regions are provided at certain intervals, like the control regions C indicated also above in FIG. 9B. The control regions for a certain pool are located at certain intervals and each control region is defined in time and frequency. This may also been seen from FIG. 9B indicating that the respective regions C are arranged at certain intervals, in the bandwidth part BWP1 at the beginning of each resource allocated to the respective resource pools for groupcast, broadcast and unicast, and in bandwidth part BWP2 at the beginning of every fourth resource allocated to the above-mentioned resource pools. In accordance with the inventive approach. to provide for the association of control data and user data, the data region associated with the control region follows the control region in time or frequency directly or with an offset and is located at the same time or frequency as the control region. For example, when considering FIG. 9B, the respective data sections D associated with a control section C follow the control section C directly in time and are located at the same frequency or sub-channels as the respective control regions C. In other embodiments, the data region D, for example in the bandwidth part BWP2 may be provided with an offset of one or more time slots, so that, for example, when considering the upper left area of bandwidth part BWP2 allocated to the broadcast group, the control information may be provided in the first slot, and data may be provided starting from the second slot.

Figure 12:
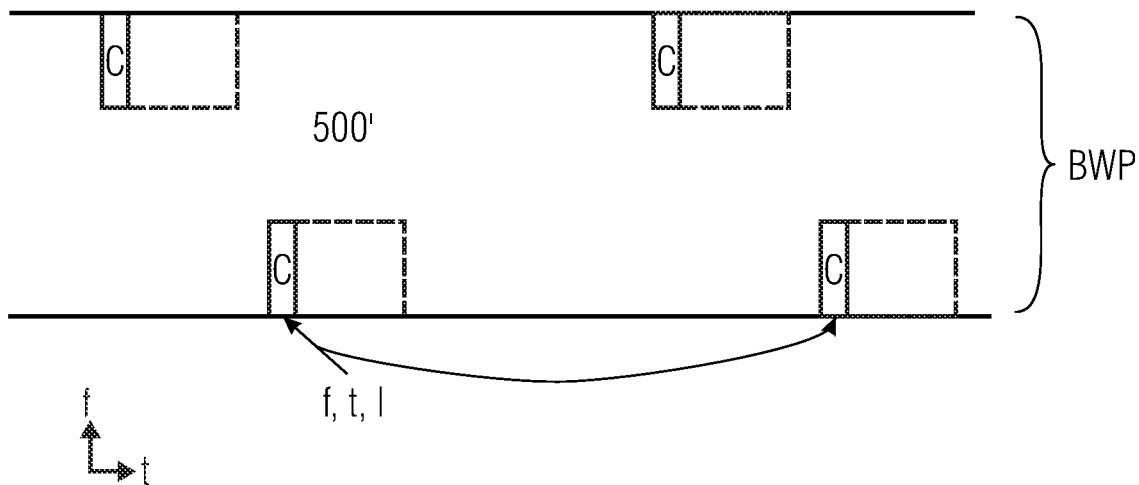
FIG. 12 illustrates embodiments of the inventive concept for associating control and data.

FIG. 12 illustrates this concept more generally and shows a subset of resources 500' which may be part of a certain bandwidth part, like bandwidth part BWP1 or BWP2 of FIG. 9, and the respective control regions C are indicated as having a certain duration in time and spanning a certain number of frequencies in the frequency domain, also referred to as a sub-channel. The data regions D follow the control region, i.e., they are provided in the same sub-channel or frequency band as the control information, as mentioned above.

Figure 13:
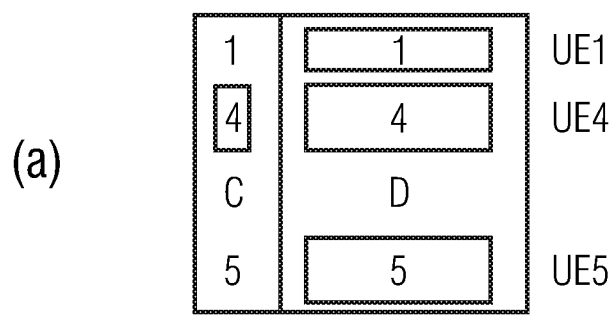
FIG. 13 illustrates embodiments for implementing control and data regions in sidelink resource pools according to the present invention.
Figure 13:
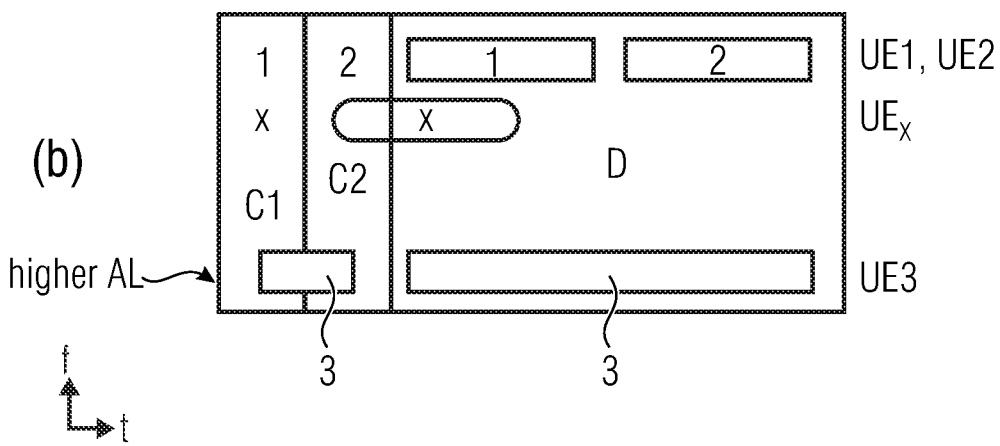

FIG. 13 illustrates examples for implementing control and data regions in sidelink resource pools as provided by the present invention. FIG. 13(a) illustrates an embodiment in which a single control region C followed by a data region D is provided. In the example depicted, it is assumed that UEs 1, 4 and 5 transmit data over a sidelink interface, either as broadcast communication or as groupcast communication. Thus, the resources in time and frequency as defined in FIG. 13(a) may belong to a groupcast communication resource pool or to a broadcast communication resource pool. In all examples in FIG. 13(a), the respective data for UE1, UE4 and UE5 immediately follows or is directly after the control data in the control section C, namely at the same frequency or in the same sub-channel.

FIG. 13(b) shows a further embodiment for implementing the concept of combined control and data regions. The control region includes two control areas $C_1$ and $C_2$ which follow each other in time. The data region D is enlarged, when compared to FIG. 13(a), i.e., spans more resources in time. The data is associated with the control information in the control areas $C_1$ and $C_2$ by placing the associated data in the same frequency band as the control information. FIG. 13(b) illustrates a situation in which a UE1 and a UE2 transmit data, for example a broadcast communication or a groupcast communication, and the resources over time and frequency belong either to the broadcast resource pool or to the groupcast resource pool. UE1 places its control information in control area $C_1$ of the first sub-channel and UE2 places its control information in control area $C_2$ of the first sub-channel. The data associated with the control information from UE1 and UE2 is placed in the same sub-channel, and the data 1 for the UE1 is offset from the control information by the second control area $C_2$, while the data associated with the control information of UE2 is separated from the control information by the data 1. The second row of FIG. 13(b) illustrates an example in which only a single UEx transmits data, and in such a case the non-occupied resources, namely the free or unused resources in control area $C_2$ may be used for transmitting the data x, i.e., in the depicted embodiment of FIG. 13(b), the data x for the UEx is provided both in the control area $C_2$ and in the data area D.

The last row of FIG. 13(b) illustrates that also control messages having a different configuration than those described so far may be employed, for example when considering a higher application layer a control message may have a length spanning both control areas $C_1$ and $C_2$ as is indicated by the control information for UE3. The associated data is located in the data region D.

Figure 14:
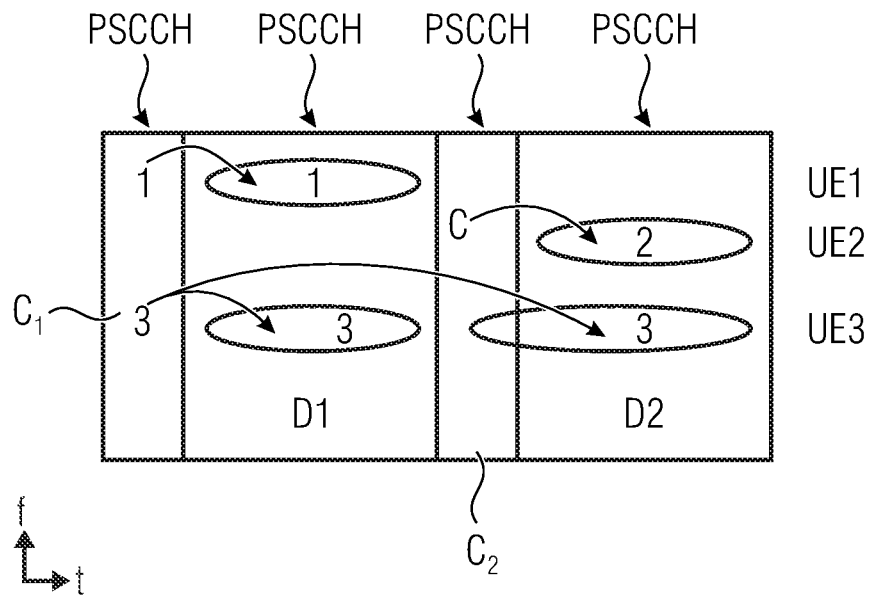
FIG. 14 illustrates an embodiment allowing the handling of data packets having a length exceeding a length of the data region.

In accordance with further embodiments, the respective control and data regions may be located such that longer data packets may be transmitted, i.e., data packets exceeding the length of a data region associated with one control region. FIG. 14 illustrates an embodiment allowing the handling of data packets having a length exceeding a length of the data region. A first control region $C_1$ is defined in time and frequency followed by the associated data region D1. The interval is selected such that a further control region $C_2$ follows the first data region D1 either directly or with a gap in time, and the associated data region D2 is also indicated. In accordance with the embodiments, data from two UEs may be transmitted in a way as described above, for example UE1 may place its control information in the first sub-channel in control region $C_1$ and its data in data region D1, while a second UE2 may use a second sub-channel and the second control region $C_2$ for placing its control information and the second data region D2 for placing its data. For handling data packets which are longer than the respective data regions D1 and D2, in accordance with further embodiments a UE3 may place its control information only in the first control region $C_1$, and the control information not only points to the resources in the data region D1 where data is present but also to resources in the second data region D2 where further data of the data packet to be transmitted is present, Thus, a receiving UE, upon decoding the control information 3 may decode from the resources in regions D1 and D2 the data of the data packet having a length being longer than the data regions D1 or D2. In accordance with the embodiments, the data in the second data region D2 may be placed only within the data region D2 or it may also use the non-used or free resources in the second control region $C_2$ as is depicted in FIG. 14 in row 3.

In the embodiment described in FIG. 14 in the third row, unnecessary control information transmission is avoided, as the SCI placed in control region $C_1$ for UE3 relates to the first data region D1 and to the second data region D2 so as to define more than one data portion or a longer data portion as mentioned above. In the SCI this may be signaled as a repetition number or a length indicator. Due to the blind decoding nature in the control area, data being user data of the UE3 and being transmitted in the control region $C_2$ will be ignored by other UEs.

Figure 15:
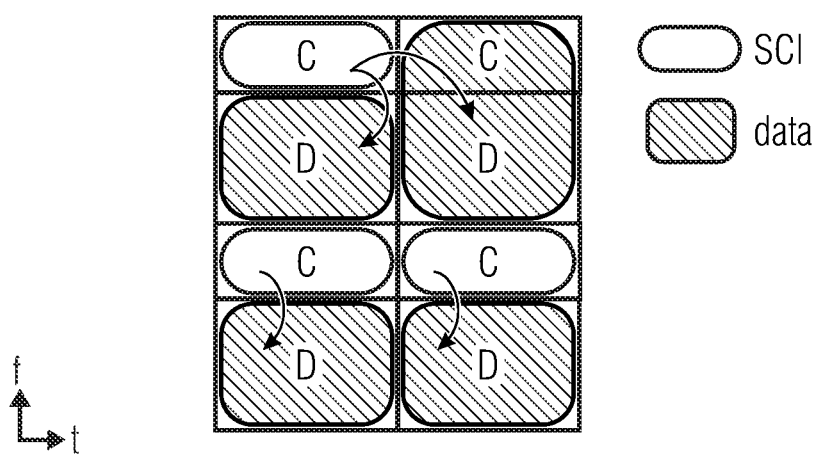
FIG. 15 illustrates an embodiment implementing the above-described association of control and data regions which are not separated in time but are separated in frequency.

In the above described embodiments, reference has been made to the implementation of the associated control and data regions using time domain multiplexing, however, the invention is not limited to TDM, but may equally be applied to frequency domain multiplexing, FDM implementations. FIG. 15 illustrates an embodiment implementing the above-described association of control and data regions which are not separated in time but are separated in frequency. FIG. 15 illustrates two frames or transmission intervals T1, T2. The respective control regions are indicated by C, and may include SCI messages. The data regions are also indicated. In accordance with the FDM approach, the respective control and data regions are not separated in time but in frequency, i.e., the control regions within a frame T1 or T2 span a certain number of subcarriers, and the data regions follow the control regions along frequency directly over the gap and span also a number of frequencies. In a similar way as described above with reference to FIGS. 12 to 14, also in the FDM case, the respective combined areas including the control and data regions may be separated by respective intervals in the frequency, and FIG. 15 describes an embodiment in which the interval is short or zero. The respective areas may be used for individual UEs to place the control information in the control region and the associated data in the corresponding data region. In a similar way as is described above with reference to FIG. 14, for transmitting longer data packets a UE may signal in one control region that data is present in more than one data region, as is depicted in the upper part of FIG. 15 indicating that the control region C points to the data regions in the frame T1 and in the frame T2. Again, in such a scenario the data in the second frame may either extend into the control region or not which is not a problem as due to the above-mentioned blind decoding of control messages, data in the control region will be ignored.

Common Control Channel for Broadcast and Grouped Resource Pools

In accordance with further embodiments of the second aspect of the present invention, in addition to the broadcast communication resource pool and the groupcast resource communication pool, at least one common control channel defined by a further subset of resources may be provided.

Figure 16:
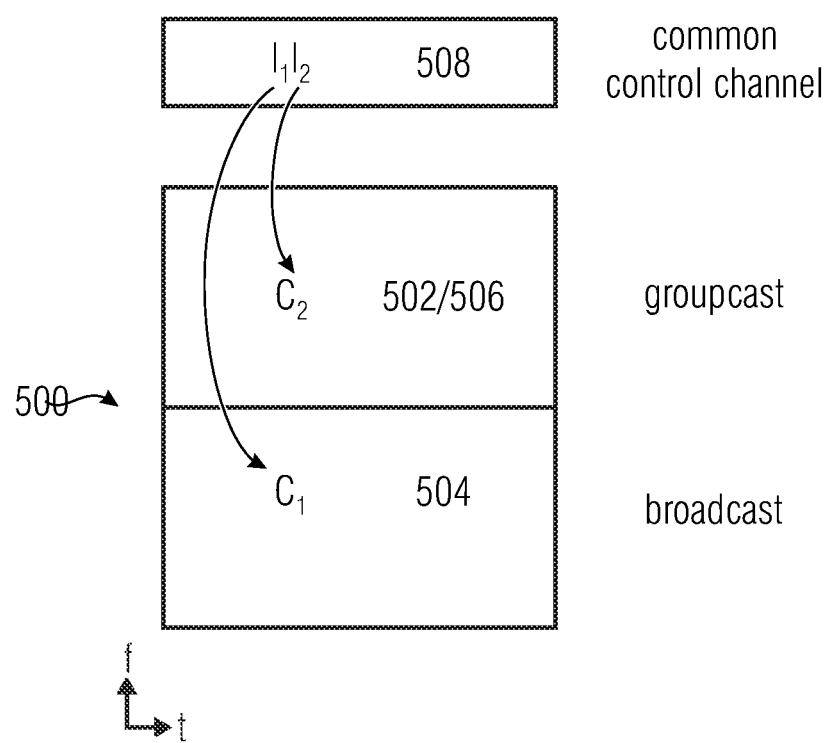
FIG. 16 illustrates an embodiment for providing the common control channel.

FIG. 16 illustrates an embodiment for providing the common control channel. In addition to the groupcast and broadcast resource pools 502, 504 an additional set of resources defining a common control channel 508 is provided, which spans in time the groupcast and broadcast communication resource pools. In case also a unicast communication resource pool is provided, the control channel also spans the unicast communication resource pool. The resources for the common control channel 508 may be selected from available resources at the base station, for example from resources 500 to be used for sidelink communication. The common control channel 508 may include basic information $I_1$ and $I_2$, for one or more receiving UEs, as indicated in FIG. 16. Further, as is indicated by $C_1$ and $C_2$ in FIG. 16, the respective resource pools for the groupcast and broadcast communications include control information for the respective UEs regarding the data to be received. In accordance with further embodiments, the basic information $I_1$ and the associated control information C1 and the associated data may be present at the same time, for example in the same frame or sub-frame, or may be offset from each other so as to be placed in different frames or sub-frames, for example.

Providing the common control channel in accordance with embodiments of the present invention allows UEs to transmit at any given point in time and not to wait for a control instance. The common control channel spans across the time of the resource pools and provides basic information to a receiving UE with regard to the position of the resource pool, like a bandwidth part, pertaining to a certain communication type, like groupcast or broadcast, to a priority of an incoming message, and, in case of a groupcast communication, to a group ID or, in case of a unicast communication to a UE ID.

FIG. 17 illustrates an embodiment of a frequency domain multiplexed common control channel and non-deferred time domain multiplexed data regions within the inventive resource pools. In this embodiment, also a dedicated resource pool for unicast communications is provided, however, the subsequently discussed principles are equally applicable for scenarios in which only a broadcast communication resource pool and a groupcast communication pool are provided, and in which unicast communications may be treated as a special case of groupcast communication. FIG. 17A illustrates an embodiment including three resource pools 502 to 506, namely the groupcast resource pool 502, the broadcast resource pool 504 and the unicast resource pool 506. In addition, the common control channel 508 is shown. In the embodiment of FIG. 17A, all resource pools 502 to 508 are selected from a set of resources having the same numerology. In this embodiment, each of the resource pools, as well as the common control channel, are formed of respective bandwidth parts. The bandwidth parts for the groupcast, broadcast and unicast communications each includes three sub-channels, and, likewise, the common control channel bandwidth part 508 includes three sub-channels, each including three resource blocks. In the common control channel, the respective basic information I is indicated, and the terms $I_n$ relate to basic information associated with UEn. The basic information labeled relates to basic information for the group m. In the respective bandwidth parts associated with the broadcast, groupcast and unicast communications, $C_n$ indicates control information for UEn, $D_n$ indicates data for UEn, $GC_m$ indicates control data for a group m, and $GD_m$ indicates data for group m. The embodiment of FIG. 17 will be described with reference to six UEs, namely UE1 to UE6, and two groups so that n equals 1, 2, 3, 4, 5 or 6 and m equals 1 or 2.

Figure 17B:
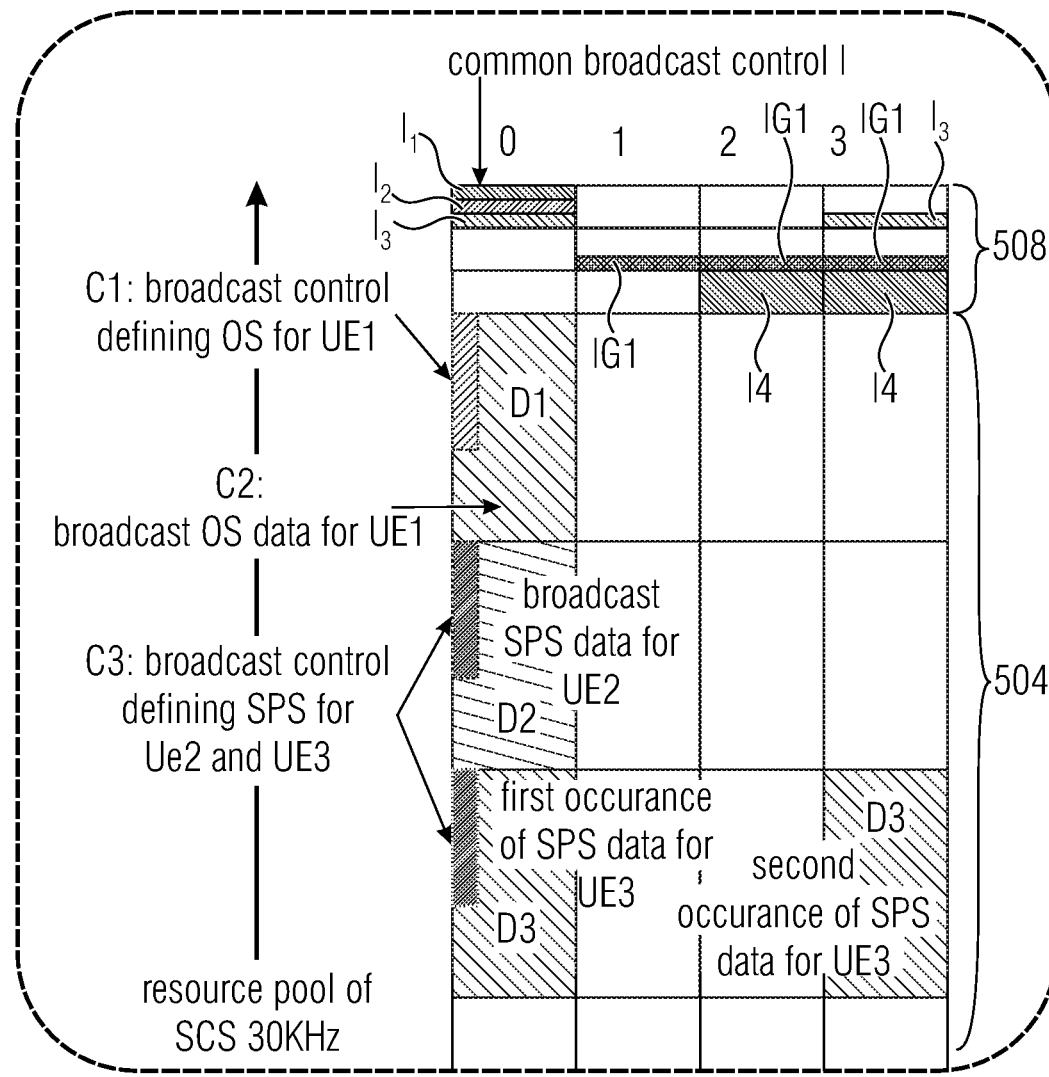
Figure 17C:
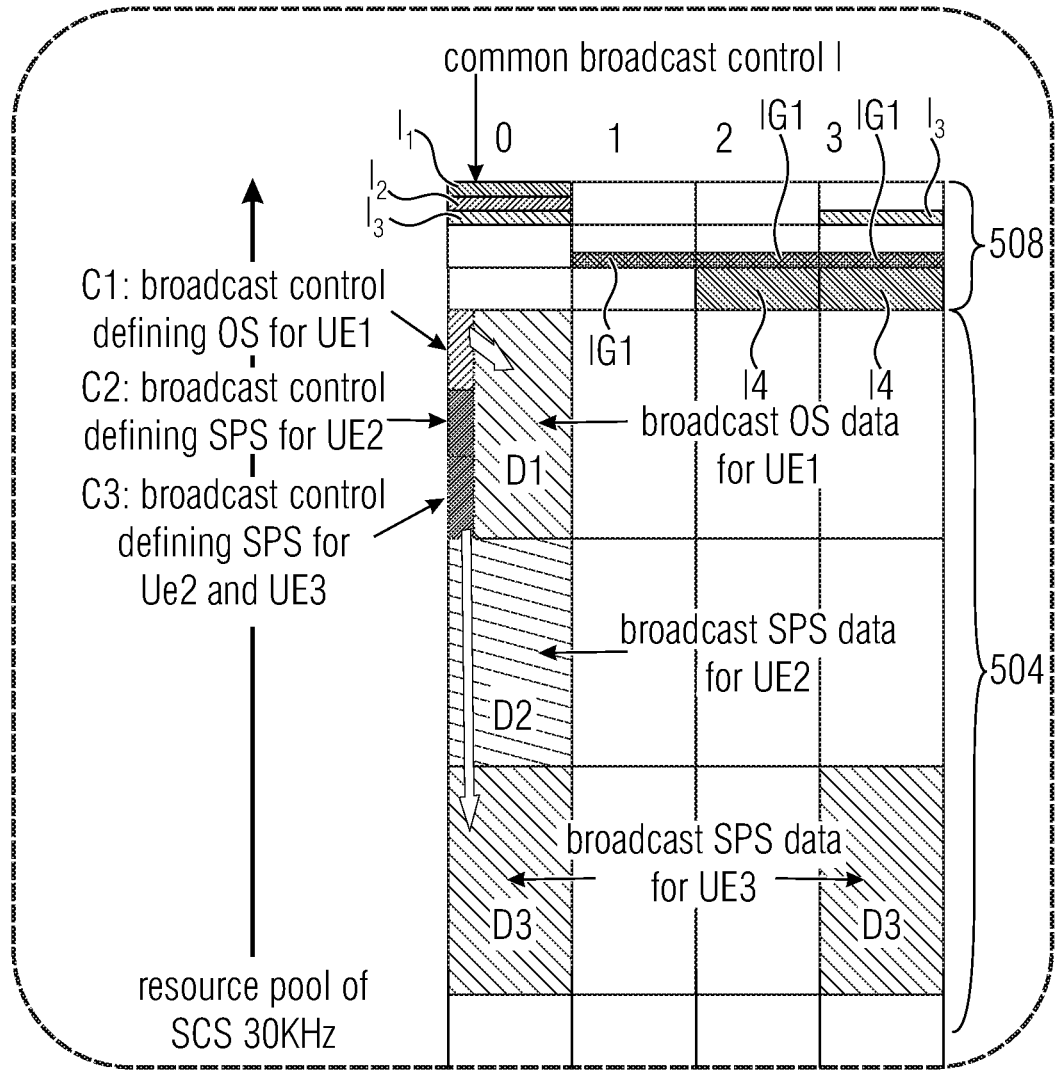
Figure 17C:
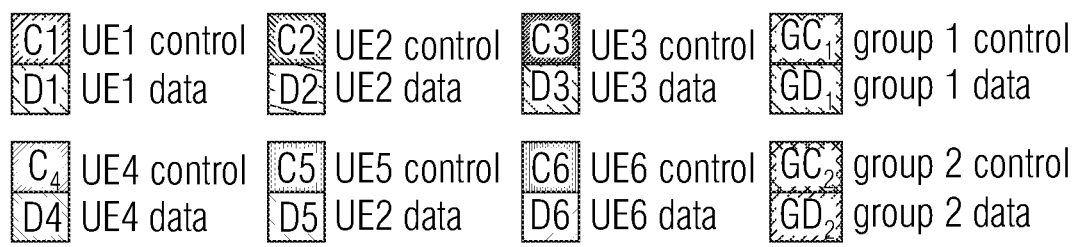

FIG. 17B is an enlarged view of the upper left part of FIG. 17B, and FIG. 17C is the same view as in FIG. 17B, however, in FIG. 17B, the control information Cn for the respective UEs is placed in only one sub-channel rather than being placed in the different sub-channels as in FIG. 17B.

The control channel 508 as depicted in FIG. 17A, points to different bandwidth parts defining the respective resource pools 502 to 506, and it is assumed that in this embodiment all bandwidth parts have the same sub-carrier spacing. The bandwidth parts in the respective resource pools may or may not be adjacent in frequency to each other, In each bandwidth part, there exists a control region Cn, also referred to as CORESET, that provides a receiving UE with further control information regarding the data to be received. In the embodiment depicted in FIG. 17A, it is assumed that the UEs obtained information regarding the resource pool structure during an initial access process, for example via an MIB or SIB. The information regarding the resource pool structure may describe the common control bandwidth part 508 and the data bandwidth parts for the respective transmission types within the resource pools.

All UEs listen to the common control channel 508 at all times, independent of whether they are part of a group communication, carry out a unicast communication or carry out a broadcast communication. In the depicted embodiment, the common control channel includes three sub-channels, and each sub-channel is indicated or is associated with a certain communication type, namely either a broadcast, groupcast or unicast communication. The size of the common control channel is N resource blocks, RBs, where N is a multiple of the total number of sub-channels present in all of the data bandwidth parts 502 to 506. Each sub-channel in the common control channel includes a set of resource blocks, and the number of resource blocks is equal to or a multiple of the number of sub-channels present in each of the bandwidth parts. Further, each sub-channel of the data bandwidth parts 502 to 506 includes a number of resource blocks. For example, if each data bandwidth part 502 to 506 includes three sub-channels and there are three bandwidth parts for the three communication types, the total number of sub-channels in the overall resource pool is nine. Hence, the size of the common control channel is a multiple of nine RBs, and in FIG. 17A, the multiplier is one so that N=9 resource blocks are provided in the common control channel and each sub-channel of the common control bandwidth parts 508 has three resource blocks. For example, when considering the upper left-hand part of FIG. 17A, one may see the basic information messages I1 to I3 in the first sub-channel of the common control channel 508 each message using one resource block.

When considering a transmitting UE, such a UE first transmits the common control information I, also referred to as CCI, in the common control channel 508 within a given sub-frame. A common control information element I or CCI spans a whole sub-frame, whereas the respective control regions in the bandwidth parts 502 to 506 span a certain number of symbols, for example the first, second and third symbols in each sub-frame. The CCI will contain information about whether the control information pertains to broadcast, groupcast or unicast, depending on which the receiving UE will further decode the CORESET in the relevant data bandwidth part in the sub-frame. The CCI may contain priority information, so that a UE may prioritize a reception and proceed accordingly. For example, a UE that has data to be decoded for multiple pools may prioritize one pool and miss transmissions from other pools. The CCI may also contain a UE ID, in case of a unicast communication, or a group ID, in case of a groupcast communication, so that only the relevant UEs need to carry out any of the additional steps for decoding the control information C and the associated data.

When considering a receiving UE, the receiving UE, while decoding the CCI or I, in the embodiment of FIG. 17A, buffers the contents of the other bandwidth parts 502 to 506, and in case the receiving UE determines that the currently decoded CCI is relevant, it will also decode the relevant buffered data bandwidth parts and discard the rest. If the receiving UE finds that the CCI is not relevant, i.e., the message does not pertain to the receiving UE, it may clear the buffer.

The control regions C or CORESETs provide a receiving UE with further information, for example, whether a transmission is periodic so that in such a case, the receiving UE will know when to expect the next transmission, or whether the transmission is non-periodic.

Each sub-channel in each of the data bandwidth parts 502 to 506 may include a control region C or CORESET mapping to the data within the sub-channel in a given sub-frame and provide a receiving UE with an implicit one-to-one control-data resource mapping, as may be seen from sub-frame 1 in FIG. 17B. In accordance with other embodiments, each data bandwidth part 502 to 506 may include only a single control region or CORESET, and the CORESET is divided into the number of sub-channels in the respective data bandwidth part. Each CORESET division is mapped to a sub-channel in the given sub-frame so that by using a single, divided CORESET the receiving UE is still provided with the above-mentioned implicit one-to-one control-data resource mapping. FIG. 17C shows a single CORESET in the first sub-frame of the bandwidth part 504, which is divided so as to hold the control data for UE1 to UE3 pointing to the respective areas where data is present in the data regions D1 to D3.

In FIG. 17A it is assumed that UE1 receives a one-shot transmission over the broadcast channel, and the CORESET C1 may include information stating that the transmission is a one-shot transmission and may define whether the data may be found across the entire data bandwidth parts 504 or only within a few of the sub-channels in the bandwidth part 504. For UE2 and UE3 a periodic broadcast transmission is assumed, and for such periodic transmissions only an initial control region C2 and D3 is needed so that the subsequent sub-frames 3, 4, 6, 8 and 9 do not include further control information for UE2 and UE3. The initial CORESET C2, C3 contains all the relevant information for the SPS transmission, including the activation/deactivation parameter, the periodicity and the SPS interval.

In case of a high priority transmission, it is possible for the CCI to contain all relevant information pointing to the data directly in the relevant data bandwidth part. In the embodiment of FIG. 17A, UE5 is considered to receive a high priority message which may be a one-shot transmission. In a similar way as with regard to UE1, the CCI I5 indicates the sub-channels where the transmission takes place, and for UE5 two of the sub-channels are used so that in the first sub-channel of the common control channel two resource blocks are associated with UE5. In the embodiment of FIG. 17A, it is indicated that the first sub-channel includes control information C5 for the broadcast one shot message, however, as mentioned above, in accordance with other embodiments for high priority messages, this information may already be included in the CCI I5 so that UE5, after decoding the common control information may proceed with decoding the data without the need for decoding the additional control C5 first.

FIG. 17A also shows embodiments for groupcast communications. In case of groupcast communications, like groupcast communications for Group 1 and Group 2, the respective CCIs, namely IG1 and IG2 are transmitted by the lead UE and may contain information regarding the mini resource pool defined in the respective bandwidth part 502 used for groupcast communications. The CCI may define the number of sub-channels within the group data bandwidth part 502 for a given group, and since for group 1 only one sub-channel is provided, the common groupcast control for group 1 is transmitted in the second sub-channel using the third resource block, whereas for the second group using two sub-channels, namely the first and second sub-channel in the bandwidth part 502, the corresponding common group cast control IG2 is transmitted in the second sub-channel of the common control channel using the first and second resource blocks. As is depicted in FIG. 17A, each of the sub-channels in each sub-frame may have a control region, and the control regions within the mini resource pool of the group may be used by the member UEs to transmit and receive the SCIs, which are relevant within the group.

FIG. 17A shows that the CCIs for Group 1 and Group 2, IG1 and IG2, are spanning the entire duration of the mini resource pool defined in the respective bandwidth part 502 used for groupcast communications, It is also possible for IG1 and IG2 to not span the entire duration of the mini resource pool, but span only across a single subframe, similar to the other CCIs in FIG. 17A, and repeated in regular intervals over the duration of the mini resource pool.

In case of a unicast communication, it may be seen that the CCI or I4 for UE4 in the sub-frames 2 and 3 spans all the numbers of resource blocks in the common control channel associated with the unicast bandwidth part 506 and, in the depicted embodiment across more than one sub-frame indicating that all the sub-channels in the bandwidth part 506 across the sub-frames are being used for a single unicast transmission.

In accordance with further embodiments, different UEs may transmit broadcast, groupcast and unicast communications in the same sub-frame, and the receiving UE may decode the CCIs of each of these transmissions in the common control channel as is indicated, for example in sub-frame 10. For example, a receiving UE may decode the CCIs I5 and I6 and decide on a priority attached to each of the CCIs which associated data should be decoded.

Figures 1, 18:
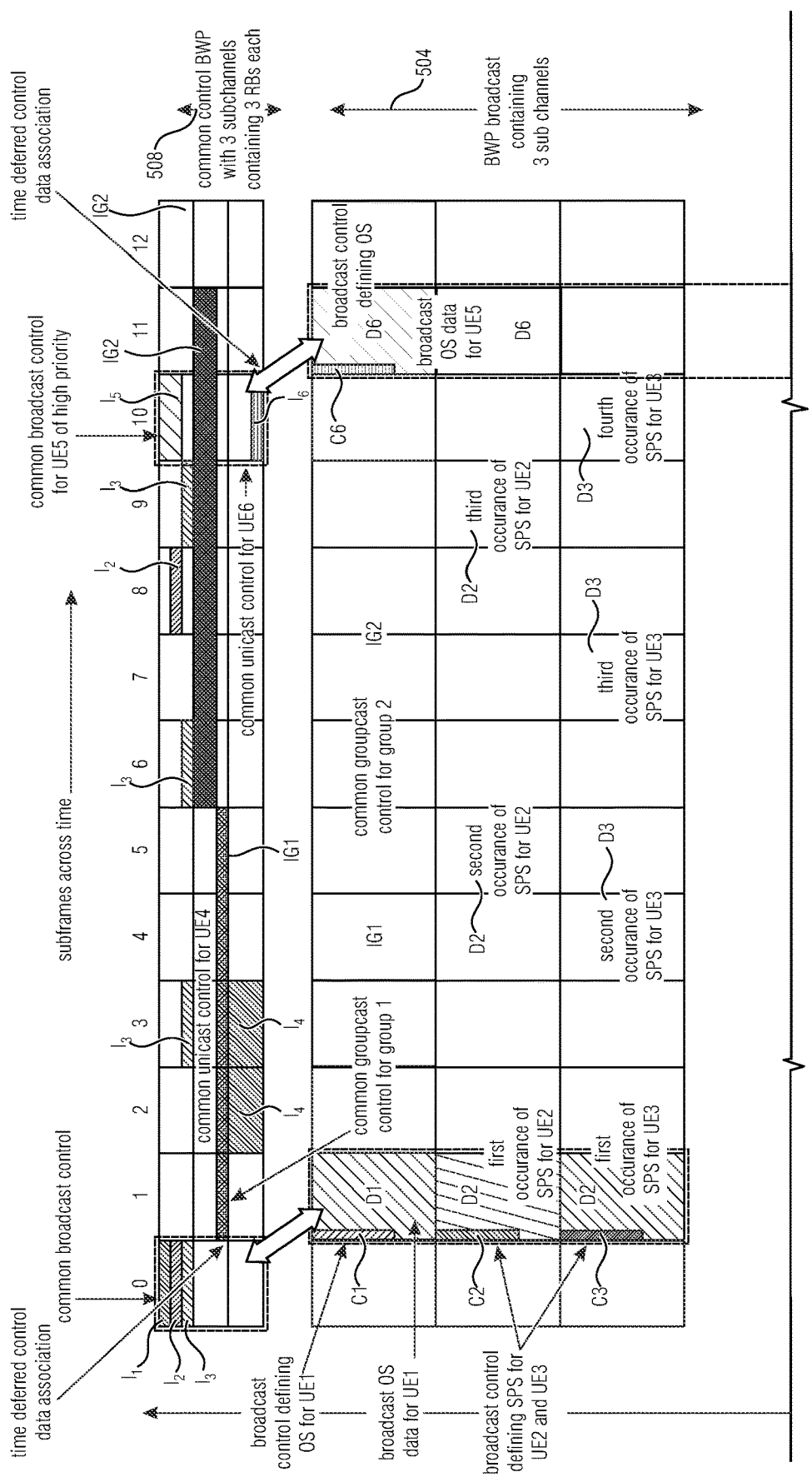
Figures 2, 18:
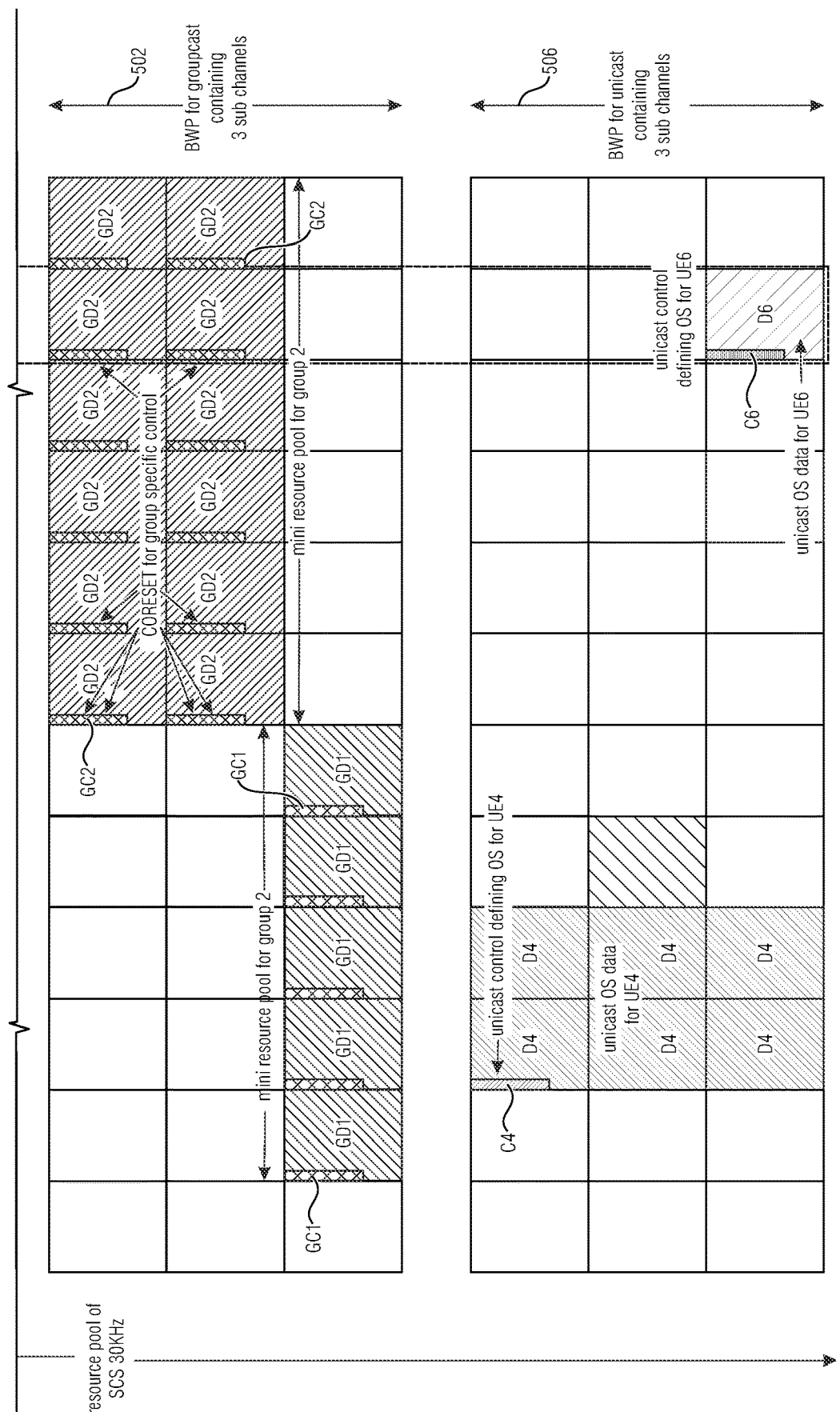

The embodiment described above with reference to FIG. 17A assumed that the CCI and the control information and data information are transmitted in the same frame, however, in accordance with other embodiments this may be offset in time. FIG. 18 illustrates a further embodiment which is similar to the one in FIG. 17A except that the control and data are time-deferred to one another. This means that the CCIs in the common control channel 508 are transmitted one or more sub-frames earlier than the actual transmission of the data and the associated further control information. An advantage of this scheme is that it is not necessary to buffer any part of bandwidth parts 502-506 at a receiving UE, rather, the receiving UE, based on the control information received via the common control channel, may receive the data in a subsequent subframe accordingly. This is depicted in FIG. 18 for the respective examples initially described in detail with reference to FIG. 17. As may be seen, except for the shift in time, by one subframe in the embodiment of FIG. 18, the situation is the same as described above with reference to FIG. 17A. The omission of the buffer comes at the cost of a delay of obtaining the data one or more sub-frames following the CCI decoding. However, a further advantage is that due to the time difference it is possible that each of the common control and data bandwidth parts 502 to 508 may have different subcarrier spacings and numerologies and, further, the time difference may take care of an AGC retuning/settling time issue.

In some of the embodiments described above, reference has been made to respective vehicles being either in the connected mode, also referred to as mode 1 or mode 3 configuration, or vehicles being in the idle mode, also referred to as mode 2 or mode 4 configuration. However, the present invention is not limited to V2V communications or V2X communications, rather it is also applicable to any device-to-device communications, for example non-vehicular mobile users or stationary users that perform a sidelink communication, e.g., over the PC5 interface. Also, in such scenarios, the inventive aspects described above may be employed.

In accordance with embodiments, the wireless communication system may include a terrestrial network, or a non-terrestrial network, or networks or segments of networks using as a receiver an airborne vehicle or a spaceborne vehicle, or a combination thereof.

In accordance with embodiments, a receiver may comprise one or more of a mobile or stationary terminal, an IoT device, a ground-based vehicle, an aerial vehicle, a drone, a building, or any other item or device provided with network connectivity enabling the item/device to communicate using the wireless communication system, like a sensor or actuator. In accordance with embodiments, a transmitter may comprise one or more of a macro cell base station, or a small cell base station, or a spaceborne vehicle, like a satellite or a space, or an airborne vehicle, like a unmanned aircraft system (UAS), e.g., a tethered UAS, a lighter than air UAS (LTA), a heavier than air UAS (HTA) and a high altitude UAS platforms (HAPs), or any transmission/reception point (TRP) enabling an item or a device provided with network connectivity to communicate using the wireless communication system.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 19:
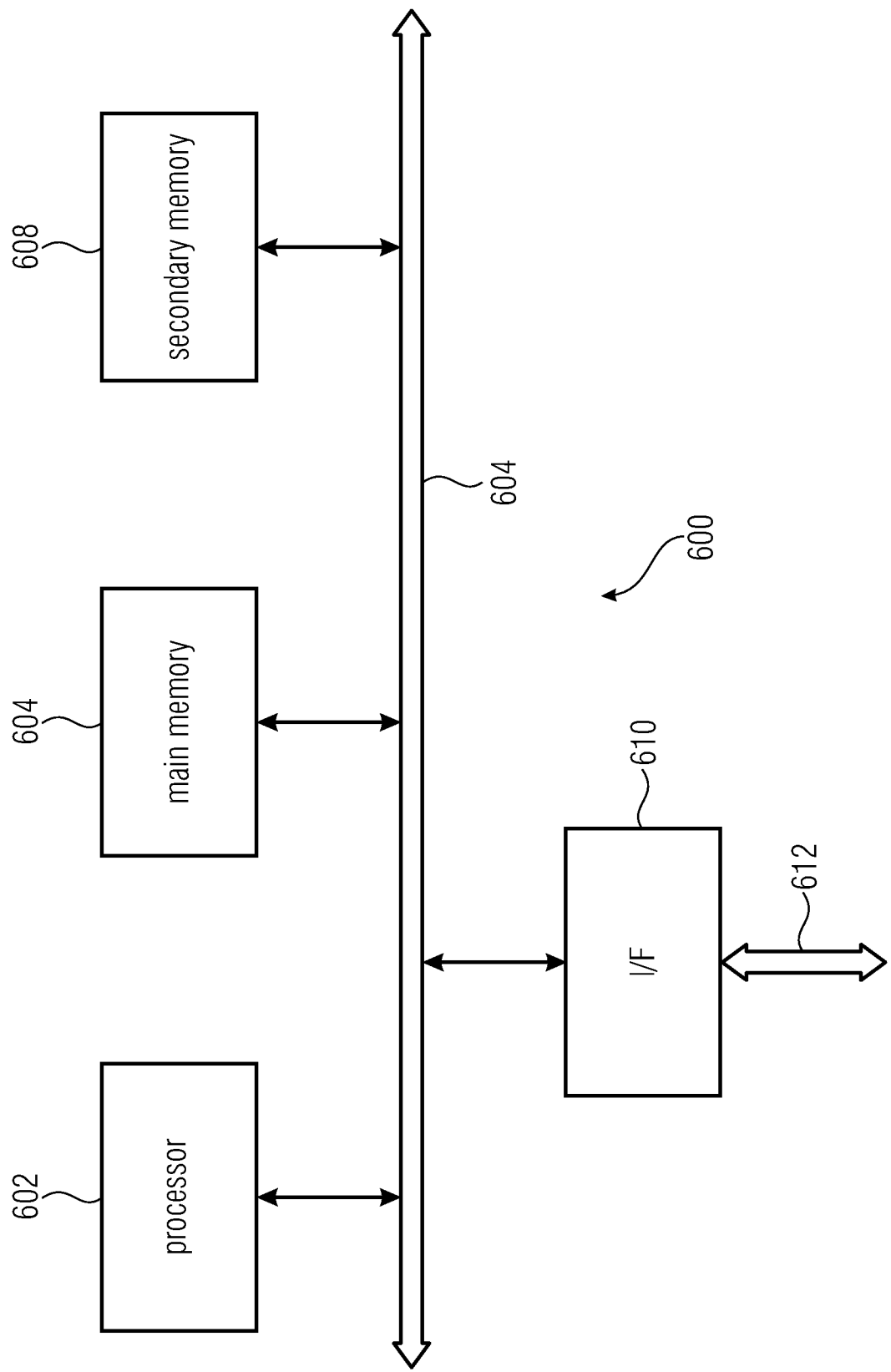
FIG. 19 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 19 illustrates an example of a computer system 600. The units or modules as well as the steps of the methods performed by these units may execute on one or more computer systems 600. The computer system 600 includes one or more processors 602, like a special purpose or a general purpose digital signal processor. The processor 602 is connected to a communication infrastructure 604, like a bus or a network. The computer system 600 includes a main memory 606, e.g., a random access memory (RAM), and a secondary memory 608, e.g., a hard disk drive and/or a removable storage drive. The secondary memory 608 may allow computer programs or other instructions to be loaded into the computer system 600. The computer system 600 may further include a communications interface 610 to allow software and data to be transferred between computer system 600 and external devices. The communication may be in the from electronic, electromagnetic, optical, or other signals capable of being handled by a communications interface. The communication may use a wire or a cable, fiber optics, a phone line, a cellular phone link, an RF link and other communications channels 612.

The terms "computer program medium" and "computer readable medium" are used to generally refer to tangible storage media such as removable storage units or a hard disk installed in a hard disk drive. These computer program products are means for providing software to the computer system 600. The computer programs, also referred to as computer control logic, are stored in main memory 606 and/or secondary memory 608. Computer programs may also be received via the communications interface 610. The computer program, when executed, enables the computer system 600 to implement the present invention. In particular, the computer program, when executed, enables processor 602 to implement the processes of the present invention, such as any of the methods described herein. Accordingly, such a computer program may represent a controller of the computer system 600. Where the disclosure is implemented using software, the software may be stored in a computer program product and loaded into computer system 600 using a removable storage drive, an interface, like communications interface 610.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

LIST OF ACRONYMS AND SYMBOLS

V2X Vehicle-to-Everything
3GPP Third Generation Partnership Project
D2D Device-to-Device
ITS Intelligent Transport Services
FR1, FR2 Frequency Range Designations
BS Base Station
eNB Evolved Node B (3G base station)
UE User Equipment
SL Sidelink
V2V Vehicle-to-Vehicle
SCS Sub Carrier Spacing
RB Resource Block
PSCCH Physical Sidelink Control Channel
PSSCH Physical Sidelink Shared Channel
TTI Transmit Time Interval
SCI Sidelink Control Information
DCI Downlink Control Information
CP Cyclic Prefix
BMP Bandwidth Part
CORESET Control Resource Set USS UE-Specific Search Space
CSS Common Search Space
RP Resource Pool
mRP Mini Resource Pool

The invention claimed is:

1. A wireless communication system, comprising:
a plurality of user devices, UEs, wherein at least some of the UEs are configured for a sidelink communication,
wherein the wireless communication system is configured to provide a set of resources for the sidelink communication among the UEs, the set of resources comprising:
 a first subset of resources to be allocated for groupcast transmissions over the sidelink for one or more groups of UEs, a group comprising two or more UEs, and
 a second subset of resources to be allocated for a broadcast transmission over the sidelink from one or more UEs to all UEs,
wherein some or all of the subsets of resources comprise a plurality of control regions and data regions,
wherein the plurality of control regions are located at certain intervals and each control region is defined in time and in frequency,
wherein the data region associated with a control region follows the control region in time or frequency directly or with an offset and is located at the same frequency or time as the control region,
wherein one or more of the control regions comprise, at a common resource, or at a common frequency or frequency band or at a common time or frame, at least a first control region and a second control region, and at least a first data region associated with the first control region and a second data region associated with the second control region, and
wherein
 the first control region comprises control data from a first UE, the second control region comprises control data from a second UE, the first data region comprises data from the first UE, and the second data region comprises data from the second UE, or
 the first control region or the second control region comprises control data from a UE, and the first and second data regions comprise data from the UE, or
 the first control region and the second control region comprises control data from a UE, and the first and second data regions comprise data from the UE, or
 the first control region comprises control data from a UE, and the second control region, the first data region and the second data region comprise data from the UE.

2. The wireless communication system of claim 1, comprising:
one or more base station,
wherein the base station is configured to
 divide an entire set of resources allocated to UEs for sidelink communications into the first subset of resources and the second subset of resources, and
 provide the UEs with information about the respective subsets so as to allow the UEs to carry out a broadcast communication or a groupcast communication.

3. The wireless communication system of claim 2, wherein the base station is configured to provide a UE with information about the respective subsets during an initial access procedure of the UE.

4. The wireless communication system of claim 2, wherein the base station is configured to
 dynamically modify the subsets based on current requirements of the UEs, or
 modify the subsets in periodic intervals using RRC configurations.

5. The wireless communication system of claim 1, wherein the subsets of resources
 comprise resources adjacent or non-adjacent across frequency, and contiguous or non-contiguous across time, or
 comprise resources of the same numerology or a plurality of groups of resources comprising different numerologies, or
 define respective resource pools or mini resource pools or a sub-pools.

6. The wireless communication system of claim 1, wherein the plurality of UEs comprises one or more in-coverage UEs and/or one or more out-of-coverage UEs.

7. The wireless communication system of claim 1, wherein a groupcast communication for a group comprising only two members is referred to as a unicast communication.

8. The wireless communication system of claim 1, wherein the set of resources further comprises:
 a third subset of resources to be allocated for one or more unicast transmissions over the sidelink from a first UE to a second UE.

9. The wireless communication system of claim 1, wherein the first and second control regions are arranged contiguous or with an offset.

10. A user device, UE, for a wireless communication system comprising one or more base stations, and a plurality of user devices, UEs,
wherein the UE is configured for a sidelink communication,
wherein the UE is configured to use a set of resources for the sidelink communication among the UEs, the set of resources comprising:
 a first subset of resources to be allocated for groupcast transmissions over the sidelink for one or more groups of UEs, a group comprising two or more UEs, and
 a second subset of resources to be allocated for a broadcast transmission over the sidelink from one or more UEs to all UEs,
wherein some or all of the subsets of resources comprise a plurality of control regions and data regions,
wherein the plurality of control regions are located at certain intervals and each control region is defined in time and in frequency,
wherein the data region associated with a control region follows the control region in time or frequency directly or with an offset and is located at the same frequency or time as the control region,
wherein one or more of the control regions comprise, at a common resource, or at a common frequency or frequency band, or at a common time or frame, at least a first control region and a second control region, and at least a first data region associated with the first control region and a second data region associated with the second control region, and
wherein
 the first control region comprises control data from a first UE, the second control region comprises control data from a second UE, the first data region comprises data from the first UE, and the second data region comprises data from the second UE, or the first control region or the second control region comprises control data from a UE, and the first and second data regions comprise data from the UE, or the first control region and the second control region comprises control data from a UE, and the first and second data regions comprise data from the UE, or the first control region comprises control data from a UE, and the second control region, the first data region and the second data region comprise data from the UE.

11. A base station for a wireless communication system comprising one or more base stations, and a plurality of user devices, UEs, wherein at least some of the UEs are configured for a sidelink communication, wherein the base station is configured to provide a set of resources for the sidelink communication among the UEs, the set of resources comprising:

a first subset of resources to be allocated for groupcast transmissions over the sidelink for one or more groups of UEs, a group comprising two or more UEs, and a second subset of resources to be allocated for a broadcast transmission over the sidelink from one or more UEs to all UEs, wherein some or all of the subsets of resources comprise a plurality of control regions and data regions, wherein the plurality of control regions are located at certain intervals and each control region is defined in time and in frequency, wherein the data region associated with a control region follows the control region in time or frequency directly or with an offset and is located at the same frequency or time as the control region, wherein one or more of the control regions comprise, at a common resource, or at a common frequency or frequency band or at a common time or frame, at least a first control region and a second control region, and at least a first data region associated with the first control region and a second data region associated with the second control region, and wherein the first control region comprises control data from a first UE, the second control region comprises control data from a second UE, the first data region comprises data from the first UE, and the second data region comprises data from the second UE, or the first control region or the second control region comprises control data from a UE, and the first and second data regions comprise data from the UE, or the first control region and the second control region comprises control data from a UE, and the first and second data regions comprise data from the UE, or the first control region comprises control data from a UE, and the second control region, the first data region and the second data region comprise data from the UE.

12. A method for a sidelink communication in a wireless communication system comprising one or more base stations, and a plurality of user devices, UEs, wherein at least some of the UEs are configured for a sidelink communication, the method comprising:

providing a set of resources for the sidelink communication among the UEs, the set of resources comprising:

a first subset of resources to be allocated for groupcast transmissions over the sidelink for one or more groups of UEs, a group comprising two or more UEs, and a second subset of resources to be allocated for a broadcast transmission over the sidelink from one or more UEs to all UEs, wherein some or all of the subsets of resources comprise a plurality of control regions and data regions, wherein the plurality of control regions are located at certain intervals and each control region is defined in time and in frequency, wherein the data region associated with a control region follows the control region in time or frequency directly or with an offset and is located at the same frequency or time as the control region, wherein one or more of the control regions comprise, at a common resource, or at a common frequency or frequency band or at a common time or frame, at least a first control region and a second control region, and at least a first data region associated with the first control region and a second data region associated with the second control region, and wherein the first control region comprises control data from a first UE, the second control region comprises control data from a second UE, the first data region comprises data from the first UE, and the second data region comprises data from the second UE, or the first control region or the second control region comprises control data from a UE, and the first and second data regions comprise data from the UE, or the first control region and the second control region comprises control data from a UE, and the first and second data regions comprise data from the UE, or the first control region comprises control data from a UE, and the second control region, the first data region and the second data region comprise data from the UE.

13. A non-transitory digital storage medium having a computer program stored thereon to perform the method for a sidelink communication in a wireless communication system comprising one or more base stations, and a plurality of user devices, UEs, wherein at least some of the UEs are configured for a sidelink communication, the method comprising:

providing a set of resources for the sidelink communication among the UEs, the set of resources comprising:

a first subset of resources to be allocated for groupcast transmissions over the sidelink for one or more groups of UEs, a group comprising two or more UEs, and a second subset of resources to be allocated for a broadcast transmission over the sidelink from one or more UEs to all UEs, wherein some or all of the subsets of resources comprise a plurality of control regions and data regions, wherein the plurality of control regions are located at certain intervals and each control region is defined in time and in frequency, wherein the data region associated with a control region follows the control region in time or frequency directly or with an offset and is located at the same frequency or time as the control region, wherein one or more of the control regions comprise, at a common resource, or at a common frequency or frequency band or at a common time or frame, at least a first control region and a second control region, and at least a first data region associated with the first control region and a second data region associated with the second control region, and wherein
- the first control region comprises control data from a first UE, the second control region comprises control data from a second UE, the first data region comprises data from the first UE, and the second data region comprises data from the second UE, or
- the first control region or the second control region comprises control data from a UE, and the first and second data regions comprise data from the UE, or
- the first control region and the second control region comprises control data from a UE, and the first and second data regions comprise data from the UE, or the first control region comprises control data from a UE, and the second control region, the first data region and the second data region comprise data from the UE.

* * * * *